United States Patent
March et al.

(10) Patent No.: US 9,495,017 B2
(45) Date of Patent: Nov. 15, 2016

(54) COMPUTING SYSTEMS FOR PERIPHERAL CONTROL

(71) Applicant: INTEL CORPORATION, Santa Clara, CA (US)

(72) Inventors: Wendy March, Portland, OR (US); Jameson H. Williams, Portland, OR (US); Mei Lu, Portland, OR (US); Todd S. Harple, Hillsboro, OR (US); Bryan R. Peebler, Folsom, CA (US); Benjamin S. Weigand, Hillsboro, OR (US); Mariano J. Phielipp, Mesa, AZ (US); Min Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/359,459

(22) PCT Filed: Nov. 20, 2013

(86) PCT No.: PCT/US2013/071057
§ 371 (c)(1),
(2) Date: May 20, 2014

(87) PCT Pub. No.: WO2015/076798
PCT Pub. Date: May 28, 2015

(65) Prior Publication Data
US 2015/0153840 A1    Jun. 4, 2015

(51) Int. Cl.
*H04N 5/232*    (2006.01)
*G06F 3/03*    (2006.01)
*G06F 3/16*    (2006.01)

(52) U.S. Cl.
CPC .............. *G06F 3/03* (2013.01); *G06F 3/165* (2013.01); *G06F 3/167* (2013.01); *H04N 5/23216* (2013.01); *H04N 5/23258* (2013.01)

(58) Field of Classification Search
CPC ..................... H04N 5/23216; H04N 5/23202; G06F 3/03; G06F 3/165; G06F 3/167
See application file for complete search history.

(56) References Cited

U.S. PATENT DOCUMENTS 6,522,893 B1 * 2/2003 Han .................. H04M 1/72519
                                                      455/550.1
8,005,992 B1    8/2011 Pichumani et al.
(Continued)

FOREIGN PATENT DOCUMENTS

WO    WO 2008-068612 A1    6/2008
WO    WO2015/096020 A1    7/2015

OTHER PUBLICATIONS

International Search Report and Written Opinion mailed Aug. 28, 2014 for International Application No. PCT/US2013/068892, 13 pages.

(Continued)

*Primary Examiner* — James Hannett
(74) *Attorney, Agent, or Firm* — Schwabe, Williamson & Wyatt, P.C.

(57) ABSTRACT

Embodiments of computing systems, and related methods, are disclosed herein. In some embodiments, a computing system may include a peripheral device (e.g., an image capture device and/or an audio output device) and control logic. The control logic may be coupled with a sensor system and the peripheral device to receive a trigger signal; receive, from the sensor system, one or more interaction signals indicative of a user interaction with the computing system; and, in response to receipt of the trigger signal and the one or more interaction signals, generate a control signal for output to the peripheral device to control operation of the peripheral device. Other embodiments may be disclosed and/or claimed.

20 Claims, 8 Drawing Sheets

(56) References Cited

U.S. PATENT DOCUMENTS

| | | |
|---|---|---|
| 2005/0282561 A1 | 12/2005 | Wu |
| 2007/0023499 A1 | 2/2007 | Wurzburg et al. |
| 2007/0204055 A1 | 8/2007 | Oishi et al. |
| 2008/0088587 A1 | 4/2008 | Pryor |
| 2008/0297505 A1 | 12/2008 | Elsberg et al. |
| 2012/0113140 A1 | 5/2012 | Hilliges et al. |
| 2012/0178410 A1* | 7/2012 | Singhal ............ H04M 1/72541 455/404.2 |
| 2012/0246377 A1* | 9/2012 | Bhesania ............ G06F 13/4068 710/313 |
| 2013/0088462 A1 | 4/2013 | So et al. |
| 2013/0162685 A1 | 6/2013 | Wickstrom |
| 2013/0225127 A1* | 8/2013 | Cavacuiti ............ H04M 1/67 455/411 |
| 2013/0262722 A1 | 10/2013 | Togano et al. |
| 2014/0055251 A1* | 2/2014 | Son ............ G08C 17/02 340/12.54 |
| 2014/0168135 A1* | 6/2014 | Saukko ............ G06F 1/1684 345/174 |

OTHER PUBLICATIONS

International Search Report and Written Opinion mailed Aug. 14, 2014 for International Application No. PCT/US2013/071057, 10 pages.

Office Action mailed Jan. 30, 2014 for U.S. Appl. No. 13/337,787, 18 pages.

Final Office Action mailed May 14, 2014 for U.S. Appl. No. 13/337,787, 17 pages.

Wikipedia: B tree (as appearing on Jun. 20, 2016): http://web.archive.org/web/20110926192855/http://en.wikipedia.org/wiki/B-tree.

International Preliminary Report on Patentability mailed Jun. 2, 2016 for International Application No. PCT/US2013/071057, 6 pages.

* cited by examiner

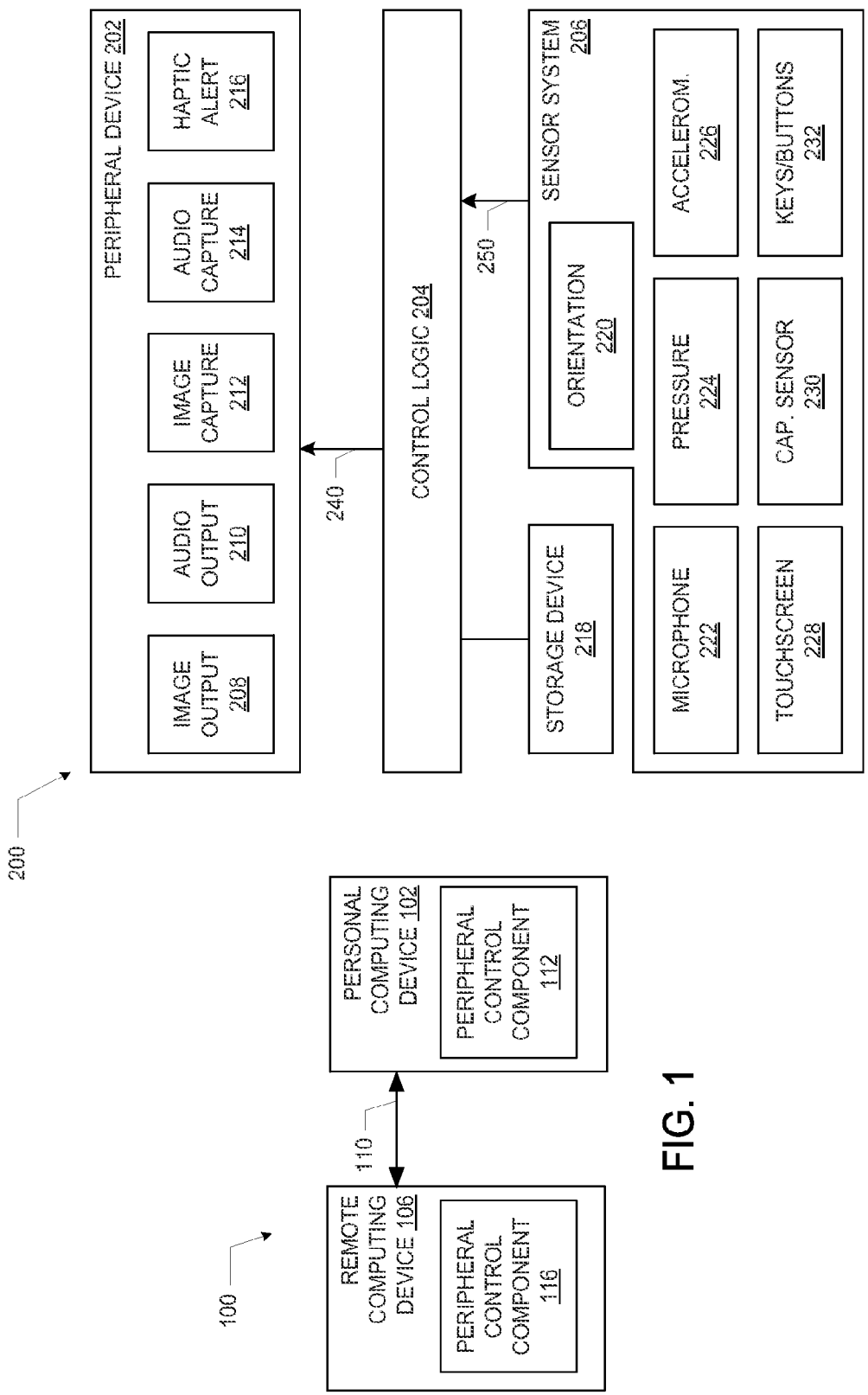

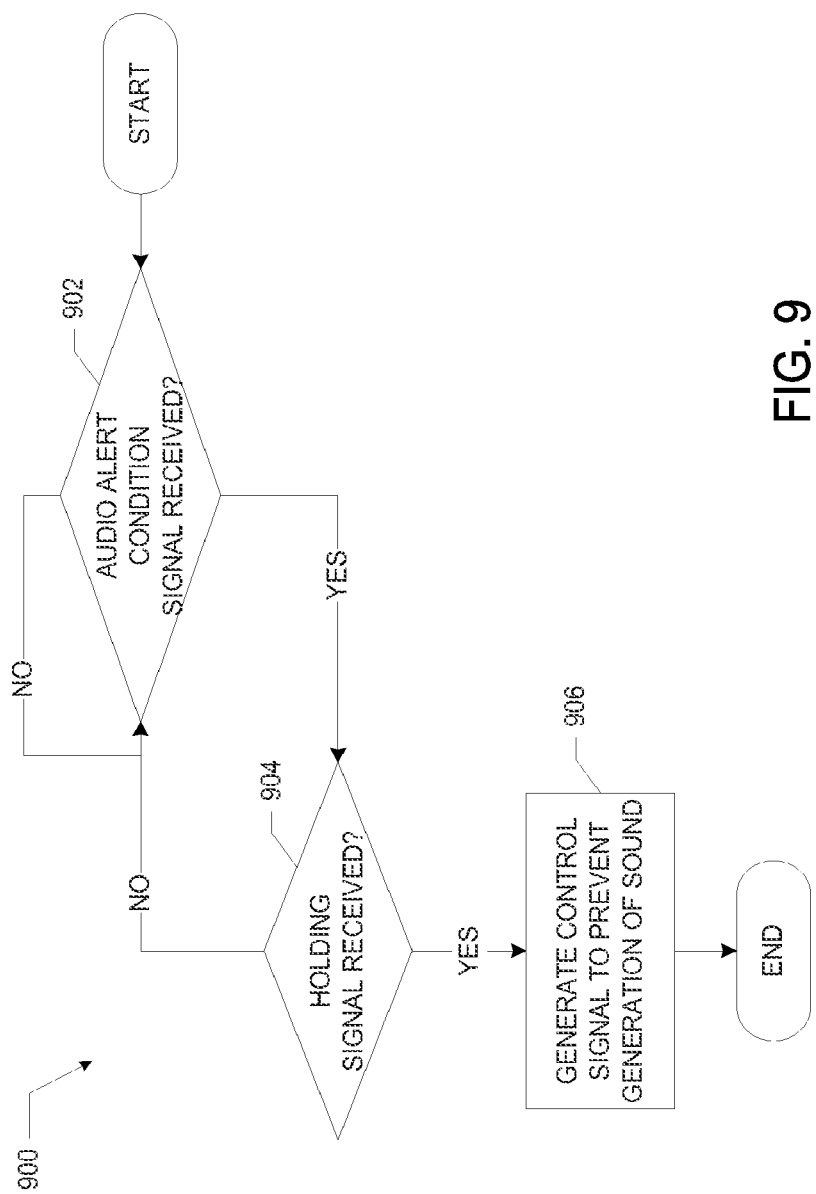

COMPUTING SYSTEMS FOR PERIPHERAL CONTROL

CROSS REFERENCE TO RELATED APPLICATION

The present application is a national phase entry under 35 U.S.C. §371 of International Application No. PCT/US2013/071057, filed Nov. 20, 2013, entitled "COMPUTING SYSTEMS FOR PERIPHERAL CONTROL," which designated, among the various States, the United States of America, and which is hereby incorporated by reference.

TECHNICAL FIELD

The present disclosure relates generally to the field of computing systems, and more particularly, to computing systems for peripheral control.

BACKGROUND

Computing devices, such as tablets and smartphones, typically provide users with graphical user interfaces (GUIs) or designated buttons for controlling operation of the device. For example, when a smartphone rings in response to an incoming call, a user may silence the ringer by pressing a designated volume button on the smartphone casing or by tapping a graphical "silence" icon on a touchscreen. Such control mechanisms may be cumbersome, time consuming, and may require more visual and tactile attention than a user has available or wishes to give to the device.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

FIG. 1 is a block diagram of an illustrative computing system configured for peripheral control in accordance with the teachings of the present disclosure.

FIG. 2 is a block diagram of an illustrative peripheral control system that may be implemented by the computing system of FIG. 1, in accordance with various embodiments.

FIG. 9 is a flow diagram illustrating a process for control of an audio output device using an audio alert condition signal and a holding signal, in accordance with various embodiments.

DETAILED DESCRIPTION

Figure 3:
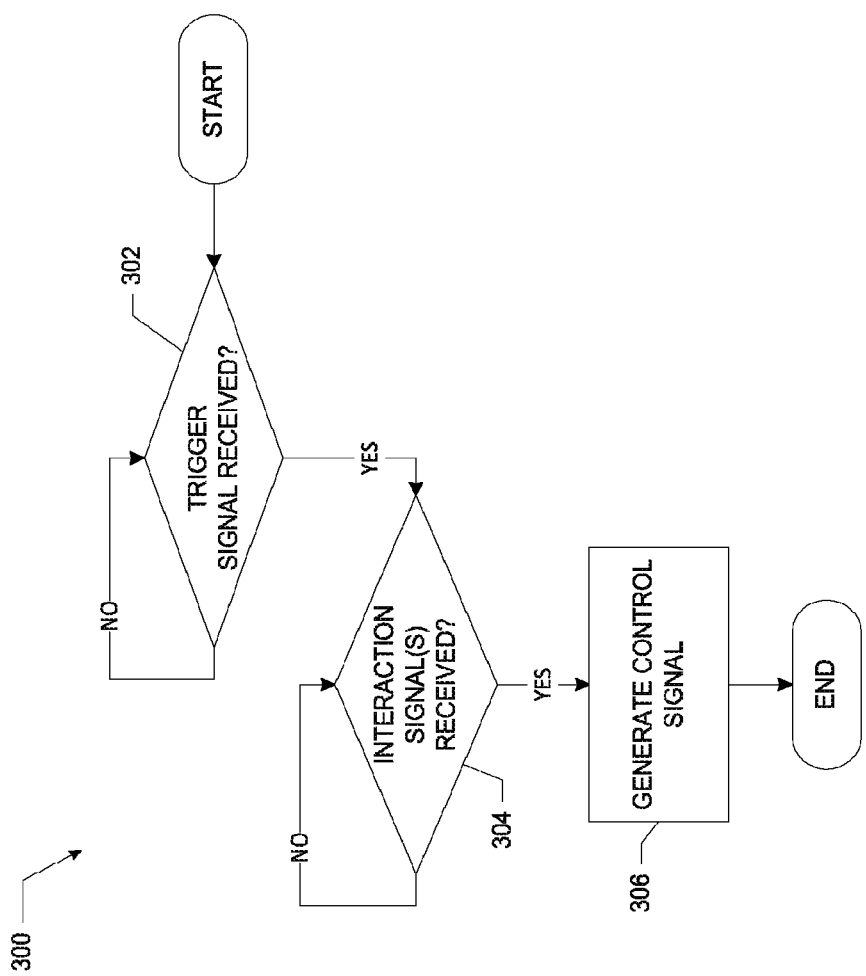
FIG. 3 is a flow diagram illustrating a process for peripheral control, in accordance with various embodiments.

Embodiments of computing systems, and related methods, are disclosed herein. In some embodiments, a computing system may include a peripheral device (e.g., an image capture device and/or an audio output device) and control logic. The control logic may be coupled with a sensor system and the peripheral device to receive a trigger signal (e.g., a tap signal); receive, from the sensor system, one or more interaction signals indicative of a user interaction with the computing system (e.g., a holding signal or a stillness signal); and, in response to receipt of the trigger signal and the one or more interaction signals, generate a control signal for output to the peripheral device to cause the peripheral device to perform an operation (e.g., a control signal to cause an image capture device to capture an image).

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the disclosed subject matter. However, the order of description should not be construed to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device).

As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, the term "peripheral" or "peripheral device" may refer to or include an auxiliary device that works in conjunction with a computing system. A peripheral device may be external to a casing that houses processing device that controls the peripheral device, or may be located inside the casing. As used herein, a "casing" of a computing system may include any housing, shell, or other mechanical component that protects, partially encloses, or holds one or more components of the computing system. A casing may be formed of metal or plastic, for example, and may include one or more apertures for connections to peripheral devices or for use by peripheral devices (e.g., an aperture for audio transducers, or an aperture for allowing light to enter a lens of an image capture device). One or more faces of a casing may include a peripheral device; for example, a tablet computing device may have a casing with one or more sides including touchscreen devices. A "casing" of a computing system may refer to a casing of at least one component of the computing system, but need not encase the entire computing system. In system-on-a-chip (SoC) settings, a peripheral may be included in a same integrated circuit as one or more processing devices that control the peripheral.

Examples of peripheral devices that may be controlled using the techniques disclosed herein include input devices (e.g., keyboards, mice, graphics tablets, touchscreens, touch pads, image capture devices such as video and still cameras operating at any wavelength, barcode scanners, audio capture devices such as microphones, Quick Response (QR) code readers, Global Positioning System (GPS) receivers, short-range wireless receivers (e.g., a Bluetooth receiver), longer-range wireless receiver, phone receivers, and radio frequency identification (RFID) readers), output devices (e.g., image output devices such as visual displays and projectors, audio output devices such as speakers and headphones, and printing devices such as 2-D or 3-D printers), and storage devices (e.g., internal or external hard drives, flash memory, disc-based computer-readable media such as CDs and DVDs, and networked-based storage such as cloud storage). Some peripheral devices, such as communication devices (e.g., modems and other wired or wireless communication interfaces) may include both input and output functionality.

FIG. 1 depicts an illustrative computing system 100 configured for peripheral control in accordance with the teachings of the present disclosure. In some embodiments, the computing system 100 may be configured to receive a trigger signal; to receive, from a sensor system, one or more interaction signals indicative of a user interaction with the computing system 100; and, in response to receipt of the trigger signal and the one or more interaction signals, to generate a control signal for output to a peripheral device to control operation of the peripheral device. The computing system 100 may include a personal computing device 102 and/or a remote computing device 106. Each of the personal computing device 102 and the remote computing device 106 may include peripheral control components (illustrated in FIG. 1 as peripheral control components 112 and 116, respectively). Peripheral control and other operations may be distributed between the peripheral control components 112 and 116 of the computing system 100 as suitable.

Several examples of the distribution of peripheral control operations between the personal computing device 102 and the remote computing device 106 are discussed herein, but any other combination of more or fewer components, and any other distribution of the operations, may be used. For example, in some embodiments, the peripheral control component 112 or the peripheral control component 116 may be omitted, and all suitable peripheral control operations (e.g., any of those described herein) may be performed by the remaining peripheral control component. In some embodiments, the computing system 100 may be configured as the peripheral control system 200 discussed below with reference to FIG. 2.

The computing system 100, as noted earlier, may include a personal computing device 102 and a remote computing device 106. Except for the peripheral control teachings of the present disclosure incorporated therein, the personal computing device 102 and the remote computing device 106 may be a broad range of such devices known in the art. Specific, but not limiting, examples are described below. Communication between the components of the computing system 100 may be enabled by the communication pathway 110. The communication pathway 110 may include a wired communication pathway and/or a wireless communication pathway, over direct couplings, and/or over personal, local and/or wide area networks. Each of the personal computing device 102 and the remote computing device 106 may include suitable hardware for supporting the communication pathway 110, such as network interface cards, modems, WiFi devices, Bluetooth devices, and so forth. In some embodiments, the communication pathway 110 may be a direct communication pathway between the personal computing device 102 and the remote computing device 106. As used herein, references to a "direct" communication pathway may refer to a communication pathway that does not route through another illustrated component, but that may route through other non-illustrated devices (e.g., routers and/or switches).

Each of the devices included in the computing system 100 may include a processing device and a storage device (not shown). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM) and so forth). Each of the computing devices included in the computing system 100 may include one or more buses (and bus bridges, if suitable) to communicatively couple the processing device, the storage device, and any other devices included in the respective computing devices. The storage device may include a set of computational logic, which may include one or more copies of computer readable media having instructions stored therein which, when executed by the processing device of the computing device, may cause the computing device to implement any of the techniques and methods disclosed herein, or any portion thereof. In some embodiments, the computational logic may include any of the logic discussed below with reference to FIGS. 2, 4, 6 and 8.

The personal computing device 102 may be a computing device that is integrated into a garment, accessory or other support structure that is configured to be worn on the body of the user (or "wearer"). Examples of suitable support structures for a wearable personal computing device 102 may include glasses, a headset, a hair accessory (e.g., a headband or barrette), an ear piece, jewelry (e.g., brooch, earrings or a necklace), a wrist band (e.g., a wristwatch), a neck band (e.g., a tie or scarf), a garment (e.g., a shirt, pants, dress skirt or jacket), shoes, a lanyard or nametag, a contact lens, or an implantable support structure, among others. In some embodiments, the personal computing device 102 may be a wrist-mounted computing device having a camera and microphone. In some embodiments, the personal computing device 102 may be a glasses-mounted computing device having a camera and microphone. In some embodiments, the personal computing device 102 may include a "world-facing" camera (i.e., a camera directed away from the wearer) and a microphone.

The personal computing device 102 may be a desktop or stand-alone computing device, or a computing device configured for carrying in a pocket, backpack or other carrying case, and for operation with one or more of a users hands. Examples of computing devices that may serve as the personal computing device 102 include cellular phones, smartphones, other handheld mobile communication devices, tablets, electronic book readers, personal digital assistants, laptops, or other such computing devices. Although the personal computing device 102 (and other components described herein) may be referred to in the singular, any number of personal computing devices may be included in the personal computing device 102 (and similarly, any component may include multiple such components). In some embodiments, the personal computing device 102 may perform any of the peripheral control techniques discussed herein.

Peripheral control and other operations performed by the personal computing device 102 may be controlled by an app or plug-in on the personal computing device 102, for example. In some embodiments, the personal computing device 102 may include two or more computing devices, one of which has more computing resources (e.g., processing power, memory, and/or communication bandwidth) than another. For example, the personal computing device 102 may include a larger tablet computing device and a smaller wrist- or glasses-mounted computing device. In such embodiments, data captured and preliminarily processed by the smaller computing device (e.g., data from a gyroscope or other sensor) may be transmitted from the smaller computing device to the larger computing device for further processing (e.g., to generate one or more trigger and/or interaction signals, as discussed below).

The remote computing device 106 may include one or more personal computing devices that are remote from the personal computing device 102, one or more servers (e.g., arranged in a "cloud" computing configuration) or other computing devices remote from the personal computing device 102. As discussed above, the communication pathway 110 between the personal computing device 102 and the remote computing device 106 may be configured according to any remote wired or wireless communication protocol. In some embodiments, the remote computing device 106 may have more computing resources (e.g., processing power, memory, and/or communication bandwidth) than the personal computing device 102. Thus, in some embodiments, data captured and preliminarily processed by the personal computing device 102 (e.g., sensor data acquired by the personal computing device 102) may be transmitted over the communication pathway 110 to the remote computing device 106 for further processing (e.g., to generate one or more trigger and/or interaction signals, as discussed below). In some embodiments, the remote computing device 106 may include a storage device for storing peripheral control data that may be accessed when the computing system 100 performs a peripheral control operation in accordance with the techniques disclosed herein. In some embodiments, the remote computing device 106 may communicate with a plurality of personal computing devices (e.g., configured similarly to the personal computing device 102). The remote computing device 106 may perform similar peripheral control operations for each personal computing device.

FIG. 2 is a block diagram of an illustrative peripheral control system 200, in accordance with various embodiments. The peripheral control system 200 may include a peripheral device 202, control logic 204, a storage device 218, and a sensor system 206. The peripheral control system 200 may be implemented by the computing system 100 of FIG. 1, in accordance with various embodiments. In particular, the components of the peripheral control system 200 may be distributed in any suitable manner among one or more of the components of the computing system 100. Components of the peripheral control system 200 may be described as implemented by the computing system 100 for illustrative purposes, but the peripheral control system 200 may be implemented by any suitably configured computing device or collection of computing devices. In some embodiments, the peripheral control system 200 may be implemented by the personal computing device 102 of the computing system 100.

The peripheral control system 200 may be configured to perform any of a number of peripheral control operations. For example, the peripheral control system 200 may be configured to receive a trigger signal; receive, from the sensor system 206, one or more interaction signals indicative of a user interaction with the computing system 100; and, in response to receipt of the trigger signal and the one or more interaction signals, generate a control signal 240 for output to the peripheral device 202 to control operation of the peripheral device 202.

As used herein, a "signal" may include a continuous or discrete electronic representation of information. A signal may include one or more values of a multi-valued storage unit (e.g., a byte of data) or waveform. For example, a trigger or interaction signal may include a signal derived from a binary waveform which takes a value of "1" when a trigger or interaction condition occurs and a value of "0" otherwise. In this example, a trigger or interaction signal may be received by the peripheral control system 200 when the peripheral control system 200 detects that the waveform has the value "1."

Although a number of components of the peripheral control system 200 are illustrated in FIG. 2, various embodiments may omit components as appropriate for the peripheral control operations to be performed. For example, in some embodiments, the peripheral control system 200 may not include the sensor system 206, but may be coupled with the sensor system 206 so as to be able to receive signals from and/or send signals to the sensor system 206. Moreover, the sensor system 206 itself may include some but not all of the sensors illustrated in FIG. 2, and/or may include sensors not illustrated. In another example, some embodiments of the peripheral control system 200 may be configured to control only the image capture device 212 and/or the audio output device 210 using the techniques disclosed herein, and thus the peripheral control system 200 may control only the image capture device 212 and/or the audio output device 210 and not the other illustrated peripheral devices. These other peripheral devices may be controlled using conventional control techniques (e.g., implemented by the control logic 204), or may not be included in the peripheral control system 200.

As noted above, the peripheral control system 200 may include a peripheral device 202. Although the peripheral device 202 may be referred to in the singular, the peripheral device 202 may include multiple peripheral devices. The peripheral device 202 may include any suitable input, output, or storage devices, for example. The peripheral device 202 may be coupled with the control logic 204, and may receive electrical signals from the control logic 204 that control the operation of the peripheral device 202. The peripheral device 202 may include suitable hardware for supporting the receipt and transmission of signals between the peripheral device 202 and the control logic 204, such as buses, device controllers, network interface cards, modems, WiFi devices, Bluetooth devices, and so forth. The peripheral device 202 may include processing and memory resources (e.g., one or more processing devices and one or more storage devices) for processing signals transmitted to or from the peripheral device 202 and to otherwise support the operation of the peripheral device 202. A number of example devices that may be included in the peripheral device 202 are discussed below but the peripheral control techniques discussed here may be used to control any suitable peripheral device.

In some embodiments, the peripheral device 202 may include an image output device 208. The image output device 208 may one or more heads-up displays (i.e., displays including a projector arranged in an optical collimator configuration and a combiner to provide data without requiring a user to look away from his or her typical viewpoint), computer monitors, projectors, touchscreens, liquid crystal displays (LCDs), light-emitting diode displays or flat panel displays, for example.

In some embodiments, the peripheral device 202 may include an audio output device 210. The audio output device 210 may include one or more speakers or other audio transducers which may be, for example, mounted in one or more earphones or earbuds which may be in wired or wireless communication with the control logic 204.

In some embodiments, the peripheral device 202 may include an image capture device 212. The image capture device 212 may include one or more still image or video cameras. In some such embodiments, the image capture device 212 may include a processing device which is configured to execute any known technique for combining the images or providing various image browsing experiences (e.g., in conjunction with other components of the peripheral control system 200, such as the image output device 208). The image capture device 212 may include a memory in which captured images may be stored (e.g., as a JPEG or other file) for later processing and/or display. Captured images may be stored in the storage device 218 additionally or alternatively.

In some embodiments, the peripheral device 202 may include an audio capture device 214. The audio capture device 214 may include one or more microphones. The audio capture device 214 may include a memory in which captured audio may be stored (e.g., as an MP3 or WAV file) for later processing and/or playback. Captured audio may be stored in the storage device 218 additionally or alternatively.

In some embodiments, the peripheral device 202 may include a haptic alert device 216. The haptic alert device 216 may include a vibrating alert motor or any other device configured to provide a haptic notification to a user.

The examples of peripheral devices provided above are not exclusive, and peripheral device 202 may include any suitable peripheral device, such as printers, wired or wireless transmitters for providing information to other devices, and storage devices. The peripheral control system 200 may include a sensor system 206. The sensor system 206 may include one or more sensors that generate electrical signals that may be communicated to components of the peripheral control system 200. The sensor system 206 may include processing and memory resources (e.g., one or more processing devices and one or more storage devices) for processing signals from the sensors included in the sensor system 206 and for generating processed signals that may be output from the sensor system 206 to the control logic 204. Examples of such generated signals are discussed below. The sensor system 206 may include suitable hardware for supporting the receipt and transmission of signals between the sensor system 206 and the control logic 204, such as buses, device controllers, network interface cards, modems, WiFi devices, Bluetooth devices, and so forth. A number of example sensors that may be included in the sensor system 206 are discussed below, but any suitable sensor may be included in the sensor system 206 in addition to or instead of any of these example sensors. Moreover, the sensors illustrated in FIG. 2 are not exclusive of each other; for example, the touchscreen 228 may include a capacitive sensor 230, the pressure sensor 224 may include a capacitive sensor 230, the orientation sensor 220 may include an accelerometer 226, etc.

In some embodiments, the sensor system 206 may include a microphone 222. The microphone 222 may include one or more uni- or multi-directional microphones. In some embodiments, the microphone 222 is included in the audio capture device 214. The sensor system 206 may process signals generated by the microphone 222. For example, the sensor system 206 may perform a Fourier analysis of audio signals captured by the microphone 222, and may perform voice identification based on the Fourier analysis and a database of voice signatures using known techniques. A sensor system 206 including a microphone 222 may generate any of a number of interaction and/or trigger signals, such as a recognized voice command or an identifier of a recognized speaker, for example.

In some embodiments, the sensor system 206 may include a pressure sensor 224. The pressure sensor 224 may include one or more strain gauges, microelectromechanical systems (MEMS) force transducers, piezoelectric transducers, or any other pressure sensor device. The sensor system 206 may process signals generated by the pressure sensor 224. For example, the sensor system 206 may include two or more pressure sensors 224 arranged in a pattern (e.g., a grid) on a casing of the computing system 100 (e.g., a casing of the personal computing device 102), and the sensor system 206 may process signals from the two or more pressure sensors 224 to classify a grip with which a user is holding the computing system 100 (e.g., by force and hand orientation). In some embodiments, the sensor system 206 may generate a squeeze signal indicating that a user has squeezed a casing including one or more pressure sensors 224, based on signals output by the one or more pressure sensors 224. A sensor system 206 including a pressure sensor 224 may generate any of a number of interaction and/or trigger signals, such as a grip type and a detection of user contact with the computing system 100, for example.

In some embodiments, the sensor system 206 may include an accelerometer 226. The accelerometer 226 may include a MEMS-based, piezoelectric, and/or a capacitive accelerometer, and may measure acceleration in one or more directions. The sensor system 206 may process signals generated by the accelerometer 226; for example, the sensor system 206 may use pattern recognition techniques to identify one or more patterns of motion of the accelerometer 226. A sensor system 206 including an accelerometer 226 may generate any of a number of interaction and/or trigger signals, such as an acceleration value, a windowed average acceleration, or a detected motion pattern, for example.

In some embodiments, the sensor system 206 may include a touchscreen 228. The touchscreen 228 may include any display that can also receive touch inputs, such as a resistive touchscreen, a surface acoustic ware touchscreen, a capacitive touchscreen, or an optical touchscreen. The touchscreen may include or operate with a stylus. The sensor system 206 may process signals generated by the touchscreen 228. For example, the sensor system 206 may classify touchscreen signals as corresponding to a tap, swipe or pinch on the touchscreen 228 by a user. A sensor system 206 including a touchscreen 228 may generate any of a number of interaction and/or trigger signals, such as tap, swipe, pinch, holding, and squeeze signals, for example. The touchscreen 228 may work in conjunction with a GUI to provide many types of signals, such as authorization signals.

In some embodiments, the sensor system 206 may include a capacitive sensor 230. The capacitive sensor 230 may measure pressure and/or contact, and two or more such sensors may be arranged in a grid or other pattern. As discussed above with reference to the pressure sensor 224, in some embodiments, a grid or other arrangement of capacitive sensors 230 may be disposed on a casing of the computing system 100. Any suitable embodiments described above with reference to the pressure sensor 224 may be implemented using the capacitive sensor 230 as the pressure sensor 224. When one or more capacitive sensors 230 are included in the sensor system 206, the sensor system 206 may be configured to recognize pinch, swipe or tap actions over the capacitive sensors 230. In some embodiments, the sensor system 206 may include keys and/or buttons 232. The keys and/or buttons 232 may include any known technology for using a mechanical button, capacitive button (with or without haptic feedback), touchpad, or other input device to receive user selections and inputs. The sensor system 206 may process signals generated by the keys and/or button 232 (e.g., by performing recognition and automatic correction of typed words). A sensor system 206 including keys and/or buttons 232 may generate any of a number of interaction and/or trigger signals, such as a selection of an item from a GUI, volume control, or text-based commands, for example.

In some embodiments, the sensor system 206 may include an orientation sensor 220. The orientation sensor 220 may include one or more geomagnetic sensors, gyroscopes, accelerometers, or any other sensors that can detect relative or absolute orientation.

The sensor system 206 may be configured to combine the signals generated by one or more sensors into a motion signature of the peripheral control system 200 or any of its components. For example, the sensor system 206 may be configured to use the signals generated by the orientation sensor 220 and the accelerometer 226 to determine a trajectory of the image capture device 212 through space, and may store the current, past or predicted future position, orientation, velocity and/or acceleration in the storage device 218 as a motion signature. The sensor system 206 may further apply one or more machine learning or other techniques to classify various motion signatures. For example, when the motion signature indicates that the image capture device 212 is moving very little, and is being held at a steady angle, the sensor system 206 may determine that a user is attempting to hold the image capture device still, and may generate a stillness signal for output to the control logic 204. Various examples of other signals that may be generated based on motion signatures are discussed herein.

Although the peripheral device 202 is illustrated separately from the sensor system 206, some devices may act as both a peripheral device and a sensor. For example, the image capture device 212 may be controlled by the control logic 204 in accordance with the peripheral control techniques disclosed herein, and may also provide images that may be used by the sensor system 206 to generate interaction and/or trigger signals. In another example, the audio capture device 214 may be controlled by the control logic 204 in accordance with the peripheral control techniques disclosed herein, and may also provide audio data that may be used by the sensor system 206 to generate interaction and/or trigger signals. In some embodiments, the audio capture device 214 may include multiple microphones with different orientations, which may allow the peripheral control system 200 or the sensor system 206 to locate various speakers and correlate those locations with subjects identified in an image captured by the image capture device 212. Further examples of such embodiments are discussed below.

The peripheral control system 200 may include a storage device 218. In some embodiments, the storage device 218 may include one or more databases or other data storage structures for storing any of the data described herein (e.g., previously received interaction and/or trigger signals) for access by any of the components of the peripheral control system 200. The storage device 218 may include any memory device, such as one or more hard drives, solid state logic, or portable storage media, for example. The storage device 218 may be local to the control logic 204, or remote from the control logic 204. The storage device 218 may include both local and remote components. The storage device 218 may include a plurality of different storage devices, which may be of different storage types (e.g., a hard drive and a portable storage device, for example).

The peripheral device 202 and the sensor system 206 may be coupled to the control logic 204. The control logic 204 may include a peripheral device interface and a sensor system interface (not shown) configured to receive data from one or more of the peripheral device 202 and the sensor system 206 and route this data to one or more of components of the control logic 204 (e.g., the components of the embodiments discussed below with reference to FIGS. 4-9). The control logic 204 may include suitable hardware for supporting the receipt and transmission of signals to and from the control logic 204 and the sensor system 206, and/or to and from the control logic 204 and the peripheral device 202, such as buses, network interface cards, modems, WiFi devices, Bluetooth devices, and so forth.

In some embodiments, the control logic 204 may be configured to receive a trigger signal. The trigger signal may be generated by the sensor system 206 or by another sensor, input device, or interface. A trigger signal may include any signal that triggers the control of a peripheral device depending upon the occurrence of one or more interaction signals. Several examples of triggers signals are discussed below. The control logic 204 may also be configured to receive, from the sensor system 206, one or more interaction signals 250. As used herein, an "interaction signal" may be a signal that is indicative of a user interaction with the peripheral control system 200. The control logic 204 may be further configured to, in response to receipt of the trigger signal and one or more interaction signals 250, generate a control signal 240 for output to the peripheral device 202 to cause the peripheral device 202 to perform an operation. In some embodiments, the control logic 204 may have different circuitry dedicated to monitoring for a trigger signal and for monitoring for one or more interaction signals 250; in some embodiments, the same circuitry of the control logic 204 may monitor for trigger signals and interaction signals 250.

FIG. 3 is a flow diagram illustrating a process 300 for controlling a peripheral device, in accordance with some embodiments. While the operations of the process 300 and the other processes described herein are arranged in a particular order and illustrated once each, in various embodiments, one or more of the operations may be repeated, omitted or performed out of order. In particular, the operations of the process 300, although illustrated as performed in a particular sequence for the sake of illustration, may be performed in parallel as suitable. For example, operations related to determining whether a trigger signal has been received and operations related to determining whether an interaction signal 250 has been received may be performed in parallel or partially in parallel, or in any suitable order.

Operations of the process 300 may be described as performed by the peripheral control system 200, as embodied in the computing system 100, for illustrative purposes, but the operations of the process 300, including individual operations of the process 300, may be performed by any suitably configured computing device or collection of computing devices. Any of the operations of the process 300 may be performed in accordance with any of the embodiments of the systems 100 and 200 described herein.

The process 300 may begin at the operation 302, in which the peripheral control system 200 (e.g., the control logic 204) may determine whether a trigger signal has been received. As used herein, a signal may be "received" when it is detected, sampled, or requested and provided, for example. If the peripheral control system 200 determines at the operation 302 that a trigger signal has not been received, the peripheral control system 200 may remain at the operation 302 and continue to monitor for receipt of a trigger signal.

If the peripheral control system 200 determines at the operation 302 that a trigger signal has been received, the peripheral control system 200 may proceed to the operation 304 and determine (e.g., using the control logic 204) whether an interaction signal 250 has been received. An interaction signal 250 may be provided by the sensor system 206. The control logic 204 may monitor for the receipt of an interaction signal 250 by monitoring an interface between the control logic 204 and the sensor system 206. If the peripheral control system 200 determines at the operation 304 that an interaction signal 250 has not been received, the peripheral control system 200 may remain at the operation 304 and continue to monitor for receipt of an interaction signal 250.

If the peripheral control system 200 determines at the operation 304 that an interaction signal 250 has been received, the peripheral control system 200 (e.g., the control logic 204) may proceed to the operation 306 and generate a control signal 240 for output to the peripheral device 202 to cause the peripheral device 202 to perform an operation. The process 300 may then end. In some embodiments, the peripheral control system 200 may perform the operation 304 in response to receipt of a trigger signal and one or more interaction signals 250, and the receipt of these signals may be monitored for in any particular arrangement (e.g., in series, in parallel, or a combination).

As noted above, although illustrated as performed in a particular sequence for the sake of illustration, the operations of the process 300 and the other processes disclosed herein (such as those discussed with reference to FIGS. 5, 7 and 9, below) may be performed in parallel as suitable. In particular, these processes may include one or more "decision" operations in which a decision is made, and one or more "conditional" operations whose performance is dependent upon the decisions made at the decision operations. For example, the process 300 may include the decision operation 302 (at which the peripheral control system 200 may determine whether a trigger signal has been received) and the decision operation 304 (at which the peripheral control system 200 may determine whether one or more interaction signals 250 have been received). The process 300 may further include the conditional operation 306, at which the peripheral control system 200 may generate a control signal 240 in response to determining that a trigger signal was received (per the operation 302) and that one or more interactions signals have been received (per the operation 304).

In some embodiments, the decisions made at the various decision operations may be required to be made substantially simultaneously or within a predetermined time of each other in order for the conditions necessary for the conditional operation to be satisfied and the conditional operation to be performed. A timer may be used, which may include circuitry having an oscillator, additional logic, and a memory in which to store a current value of the timer. Any suitable time relationships between various decisions may be used in executing any of the processes disclosed herein. Although time relationships between decisions may be explicitly represented in only a subset of the embodiments discussed herein (e.g., with respect to the process 700 of FIG. 7), any of the conditions (e.g., the decisions of decision operations) underlying any of the conditional operations disclosed herein may be subject to one or more timing constraints. For example, in some embodiments of the process 300, a control signal 240 may be generated at the operation 306 when an interaction signal 250 is received at 1:37:42 PM and a trigger signal is received at 1:37:44 PM (e.g., when the allowable window between receipt of such signals is three seconds or less), but a control signal 240 may not be generated (i.e., the operation 306 may not be performed) when an interaction signal 250 is received at 1:37:42 PM and a trigger signal is received at 1:37:56 PM (outside the three second window). A three second window is simply illustrative, and windows of any length may be used. In particular, windows tied to events or conditions may be used; for example, in the process 700 of FIG. 7, a squeeze signal may only operate to stop the generation of sound if received while sound is being generated.

A number of embodiments of the peripheral control system 200 (FIG. 2) and the method 300 (FIG. 3) are discussed in the following paragraphs. Each of these embodiments may be implemented alone or in any suitable combination, and may be modified in accordance with any of the teachings herein.

Figure 4:
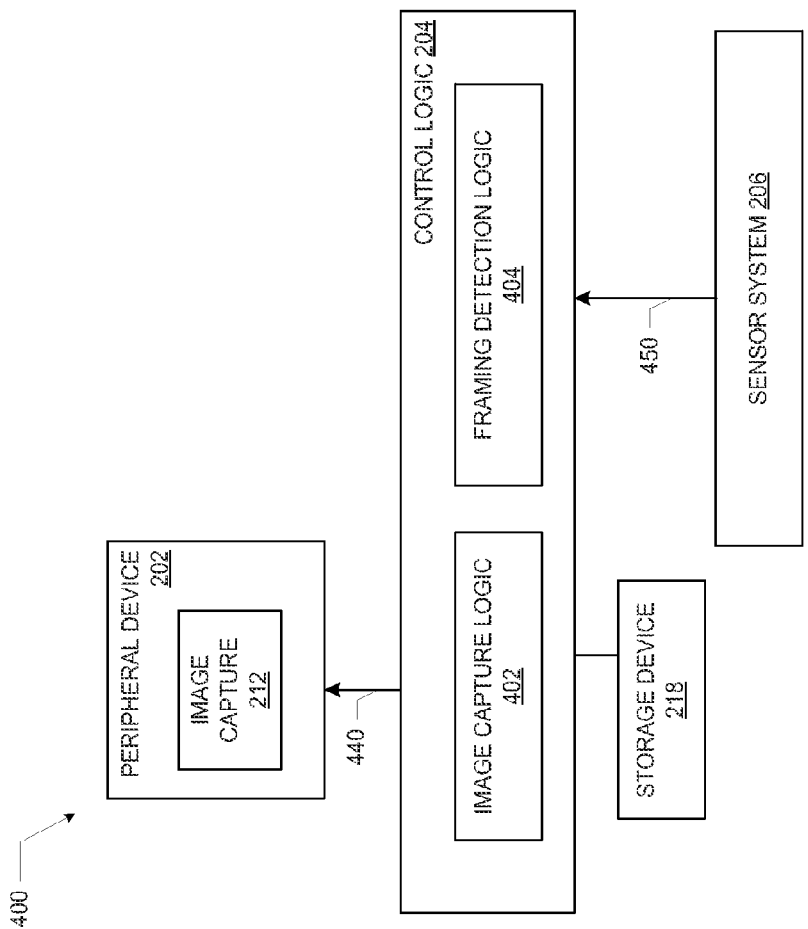
FIG. 4 is a block diagram of an embodiment of the illustrative peripheral control system of FIG. 2, configured for control of an image capture device using tap, holding, and stillness signals, in accordance with various embodiments.

FIG. 4 is a block diagram of an embodiment 400 of the peripheral control system 200 of FIG. 2. The peripheral control system 400 may be configured for control of an image capture device (e.g., the image capture device 212) using tap, holding, and stillness signals, as discussed below.

In the peripheral control system 400, the peripheral device 202 may include the image capture device 212. The image capture device 212 may be implemented in accordance with any of the embodiments of image capture devices described herein, or any other suitable image capture device.

In the peripheral control system 400, the sensor system 206 may take the form of any of the sensor systems described herein, or any other suitable sensor system. For example, in some embodiments, the sensor system may include a plurality of capacitive sensors coupled to a casing of the computing system 100. In a smartphone with an embedded image capture device 212, the capacitive sensors may be coupled to a casing of the smartphone. A sensor coupled to (e.g., integral with) a casing may be referred to as a "casing sensor." Examples of casing sensors may include touchscreens and capacitive sensors, among others.

In the peripheral control system 400, the trigger signal may include a tap signal. The tap signal may be provided to the control logic 204 by the sensor system 206, which may generate the tap signal by processing signals generated by one or more of the sensors included in the sensor system 206. The tap signal may indicate that a user has tapped a casing of the computing system 100. In some embodiments, the sensor system 206 may generate the trigger signal based on signals generated by capacitive sensors 230 coupled to a casing of the peripheral control system 400; for example, when a momentary contact between the casing a users finger or a stylus is detected.

In some embodiments, the tap signal may indicate a single tap on the casing; a double tap may not be required or desirable, as it may introduce too much shaking of the image capture device 212. In some embodiments, the tap signal may be generated based on a tap anywhere on the casing, while in other embodiments, only a tap on a portion of the casing that corresponds to the traditional location of a shutter button on a camera (e.g., in an upper right corner, the location of which may vary based on the orientation of the image capture device 212) may cause the generation of a tap signal. Embodiments in which a double tap is required to generate a tap signal may be advantageous when the peripheral control system 200 and/or the sensor system 206 does not have access to an up-to-date motion signature of the image capture device 212, and cannot tell whether or not the image capture device 212 is moving.

In the peripheral control system 400, the sensor system 206 may generate one or more interaction signals 450. The one or more interaction signals 450 may take the form of any of the interaction signals disclosed herein, including the one or more interaction signals 250. In some embodiments, the one or more interaction signals 450 may include a holding signal. The sensor system 206 may generate a holding signal by processing signals generated by one or more of the sensors included in the sensor system 206. The holding signal may indicate that a user is holding the image capture device 212 in the users hand. In some embodiments, the sensor system 206 may generate the holding signal based on signals generated by capacitive sensors 230 coupled to a casing of the peripheral control system 400; for example, when the number of contact points between the casing and the user exceeds a threshold, when the area of contact between the casing and the user exceeds a threshold, or when the pattern of contact with the casing indicates the casing is being held in a user's hand (e.g., based on an expected non-uniform pattern of contact with the casing).

In some embodiments, the one or more interaction signals 450 may include a stillness signal. The sensor system 206 may generate a stillness signal by processing signals generated by one or more of the sensors included in the sensor system 206. The stillness signal may indicate that a motion signature of the image capture device 212 indicates that the user is attempting to hold the image capture device 212 still. A stillness signal may be generated when the motion signatures varies no more than a designated amount in a particular window of time, indicating an attempt to hold the image capture device 212 still.

In the peripheral control system 400, the control logic 204 may be configured to generate a control signal 440 for output to the image capture device 212 to cause the image capture device 212 to perform an operation. The control logic 204 may include framing detection logic 404 and image capture logic 402. The framing detection logic 404 may be coupled with the sensor system 206, and may be configured to receive the holding signal and the stillness signal from the sensor system 206. The framing detection logic 404 may be further configured to generate a framing signal in response to receipt of at least the holding signal and the stillness signal.

The image capture logic 402 may be coupled with the framing detection logic 404 and the image capture device 212, and may be configured to generate a capture signal (included in the control signal 440) to cause the image capture device 212 to capture an image (e.g., by taking a still photograph or beginning to capture video). The image capture logic 402 may generate the capture signal in response to receiving the tap signal (e.g., from the sensor system 206) and the framing signal (e.g., from the framing detection logic 404). In some embodiments, the image capture logic may be configured to determine whether the tap signal has been received prior to a determination of whether the framing signal has been received.

Other interaction signals 450 may be received from the sensor system 206, in addition to or instead of the holding signal and the stillness signal, and may be used to determine when the image capture logic 402 generates the control signal 440 for output to the image capture device 212. In some embodiments, the one or more interaction signals 450 may include an orientation signal. The sensor system 206 may generate an orientation signal by processing signals generated by one or more of the sensors included in the sensor system 206. The orientation signal may indicate that a motion signature of the image capture device 212 indicates that a user is attempting to hold the image capture device 212 in an upright orientation. In some embodiments, the image capture device 212 (i.e., a device in which the image capture device 212 is embedded, such as a smartphone or tablet) may have a principal axis of image capture, and the image capture device 212 may be in an upright orientation when the principal axis of image capture is approximately horizontal. The framing detection logic 404 may be further configured to receive the orientation signal, and may generate the framing signal in response to receiving at least the orientation signal. For example, the framing detection logic 404 may generate the framing signal in response to receiving the holding signal, the stillness signal and the orientation signal.

Another example of an interaction signal 450 is an authorization signal. In some embodiments of the peripheral control system 400, the sensor system 206 may generate an authorization signal by processing signals generated by one or more of the sensors included in the sensor system 206. The authorization signal may indicate that the user has authorized image capture operations by the peripheral control system 400 (e.g., as implemented in the computing system 100). The image capture logic 402 may be configured to receive the authorization signal, and may generate the capture signal in response to receiving at least the authorization signal. For example, the control logic 204 may generate the control signal 440 in response to receiving the holding signal, the stillness signal and the authorization signal. In some embodiments, the authorization signal may be generated by the sensor system 206 when a user selects an image camera application via a GUI.

The control logic 204 may also recognize other signals and control the peripheral device 202 accordingly. For example, the sensor system 206 may be further configured to provide a swipe signal detected via the capacitive sensors 230 to the control logic 204. The swipe signal may be processed by the control logic 204 and used to cause the image capture device 212 to zoom in or out. The sensor system 206 may store parameters used in generating the holding, stillness, and orientation signals (and/or other interaction signals) in a storage device. These parameters, such as the amount of force, the time over which the force is applied, the pattern of force, the amount of allowed rotation, and/or the amount of allowed translation, for example, may be varied for different applications and may be customized for the user by implementing one or more known training techniques (e.g., machine learning).

The peripheral control system 400 of FIG. 4 may provide a number of potential advantages to a user of an image capture device. In existing smartphones and tablets with embedded image capture devices, a user must active an image capture application through the GUI, orient the image capture device to frame the desired image, and tap a designated portion of a touchscreen or press a designated button in order to capture an image. Embodiments of the peripheral control system 400 may eliminate or reduce the burden of one or more of these steps, making the image capture process faster, easier, and more accurate. In particular, the peripheral control system 400 may advantageously recognize the "stillness" that often comes before a user prepares to capture an image when the user is framing the desired scene. In various embodiments, the peripheral control system 400 may receive a stillness signal from the sensor system 206 that is indicative of this stillness. The peripheral control system 400 may also advantageously recognize the position in which a user typically holds a computing system with an image capture device when the user is preparing to capture an image (e.g., held in the user's hand, not in a pocket or lying on a countertop). In various embodiments, the peripheral control system 400 may receive a holding signal from the sensor system 206 that is indicative of the computing system being held in a user's hand. When stillness and holding signals are received, the peripheral control system 400 may enter a state in which a subsequent tap on a casing of the computing system (e.g., as sensed by the capacitive sensor 230, the touchscreen 228 or other sensor of the sensor system 206) may trigger the capture of an image.

In some embodiments, the peripheral control system 400 may further require an orientation signal from the sensor system 206, indicating that a user is attempting to hold the image capture device 212 in an upright orientation (e.g., based on a motion signature of the image capture device 212) before the peripheral control system 400 will cause the capture of an image based on the receipt of a tap signal. Requiring the receipt of one or more interaction signals 450 (representing a user's intent to capture an image) before a received trigger signal may reduce false positives during the image capture process (e.g., by not capturing an image in response to every tap).

Allowing a tap signal to trigger the capture of an image may reduce the overhead incurred when a dedicated image capture button is provided and required. Such a button may or may not be in the right position for a particular camera orientation, and thus using such a button may be cumbersome for a user. A user may inadvertently move or shake the camera in trying to find a dedicated button or touchscreen area, both of which may disrupt the image capture experience. By using a tap signal, in various embodiments, a user may keep his or her hands in one position, and may tap with either the right or left hand.

Figure 5:
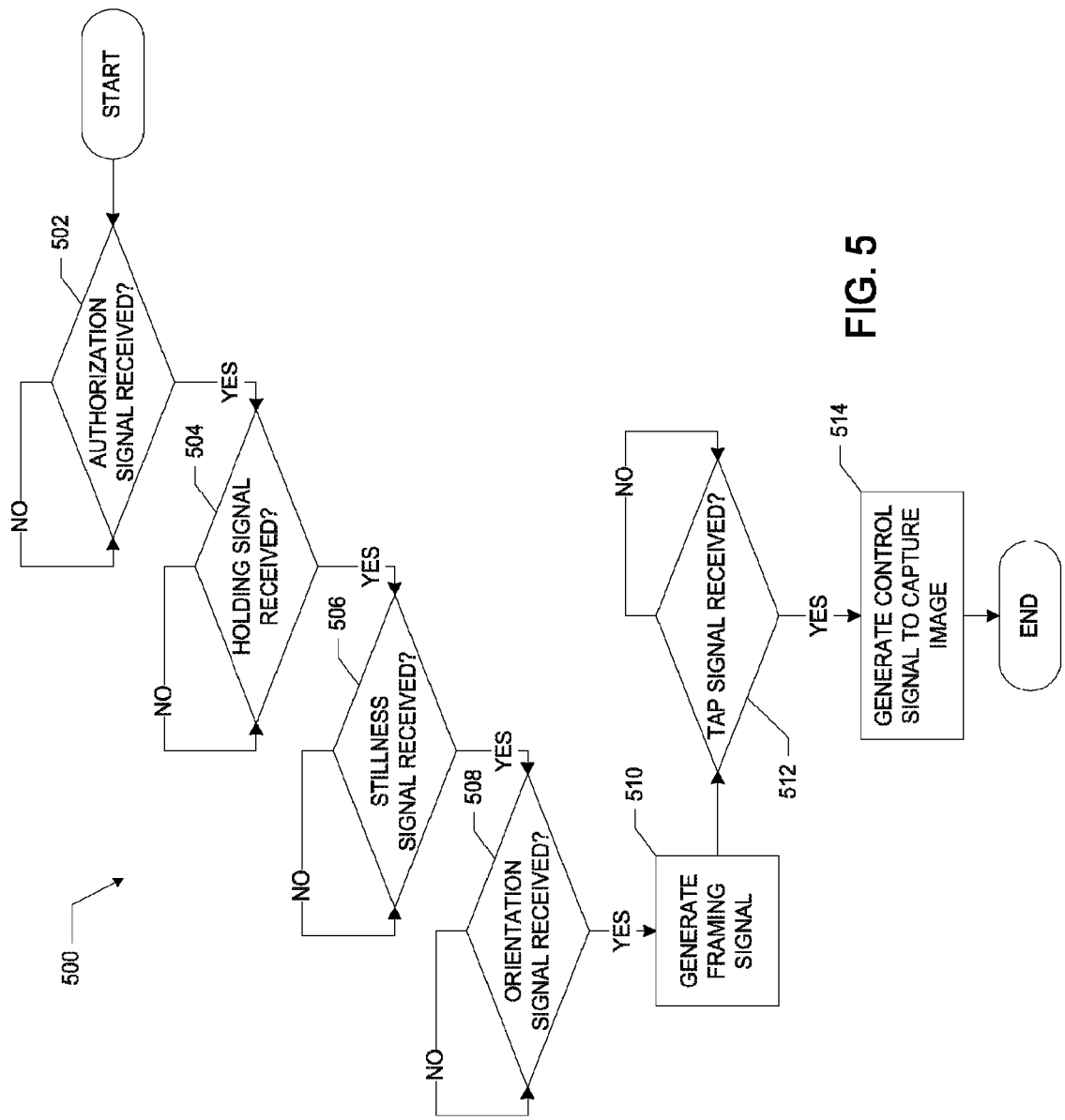
FIG. 5 is a flow diagram illustrating a process for control of an image capture device using tap, holding, and stillness signals, in accordance with various embodiments.

FIG. 5 is a flow diagram illustrating a process 500 for control of an image capture device (e.g., the image capture device 212) using tap, holding, and stillness signals, in accordance with some embodiments. The operations of the process 500, although illustrated as performed in a particular sequence for the sake of illustration, may be performed in parallel as suitable. For example, operations related to determining whether authorization, holding, stillness, orientation and tap signals have been received may be performed in parallel or partially in parallel, or in any suitable order.

Operations of the process 500 may be described as performed by the peripheral control system 400, as embodied in the computing system 100, for illustrative purposes, but the operations of the process 500, including individual operations of the process 500, may be performed by any suitably configured computing device or collection of computing devices. Any of the operations of the process 500 may be performed in accordance with any of the embodiments of the systems 100 and 200 described herein.

The process 500 may begin at the operation 502, in which the peripheral control system 400 (e.g., the image capture logic 402) may determine whether an authorization signal has been received. The authorization signal of the operation 502 may indicate that the user has authorized image capture operations by the computing system 100. If the peripheral control system 400 determines at the operation 502 that an authorization signal has not been received, the peripheral control system 400 may remain at the operation 502 and continue to monitor for receipt of an authorization signal.

If the peripheral control system 400 determines at the operation 502 that an authorization signal has been received, the peripheral control system 400 may proceed to the operation 504 and determine (e.g., using the framing detection logic 404) whether a holding signal has been received. The holding signal of the operation 504 may indicate that a user is holding the image capture device 212 in the user's hand. If the peripheral control system 400 determines at the operation 504 that a holding signal has not been received, the peripheral control system 400 may remain at the operation 504 and continue to monitor for receipt of a holding signal.

If the peripheral control system 400 determines at the operation 504 that a holding signal has been received, the peripheral control system 400 may proceed to the operation 506 and determine (e.g., using the framing detection logic 404) whether a stillness signal has been received. The stillness signal of the operation 506 may indicate that a motion signature of the image capture device 212 indicates that the user is attempting to hold the image capture device still. If the peripheral control system 400 determines at the operation 506 that a stillness signal has not been received, the peripheral control system 400 may remain at the operation 506 and continue to monitor for receipt of a stillness signal.

If the peripheral control system 400 determines at the operation 506 that a stillness signal has been received, the peripheral control system 400 may proceed to the operation 508 and determine (e.g., using the framing detection logic 404) whether an orientation signal has been received. The orientation signal of the operation 508 may indicate that the motion signature of the image capture device 212 indicates that the user is attempting to hold the image capture device 212 in an upright orientation. If the peripheral control system 400 determines at the operation 508 that an orientation signal has not been received, the peripheral control system 400 may remain at the operation 508 and continue to monitor for receipt of an orientation signal.

If the peripheral control system 400 determines at the operation 508 that an orientation signal has been received, the peripheral control system 400 may proceed to the operation 510 and generate a framing signal. The framing signal may be generated at the operation 510 by the framing detection logic 404, and may be output to the image capture logic 402. The peripheral control system 400 may proceed to the operation 512, at which the peripheral control system 400 (e.g., the image capture logic 402) may determine whether a tap signal has been received. The tap signal of the operation 512 may indicate that a user has tapped a casing of the computing system 100. If the peripheral control system 400 determines at the operation 512 that a tap signal has not been received, the peripheral control system 400 may remain at the operation 512 and continue to monitor for receipt of a tap signal. In some embodiments, the image capture logic 402 may be configured to determine whether the tap signal has been received prior to a determination of whether the framing signal has been received (e.g., from the framing detection logic 404).

If the peripheral control system 400 determines at the operation 512 that a tap signal has been received, the peripheral control system 400 may proceed to the operation 514 and generate a control signal 440. In some embodiments, the control signal 440 may be output to the image capture device 212, and may cause the image capture device 212 to capture an image. The process 500 may then end.

Figure 6:
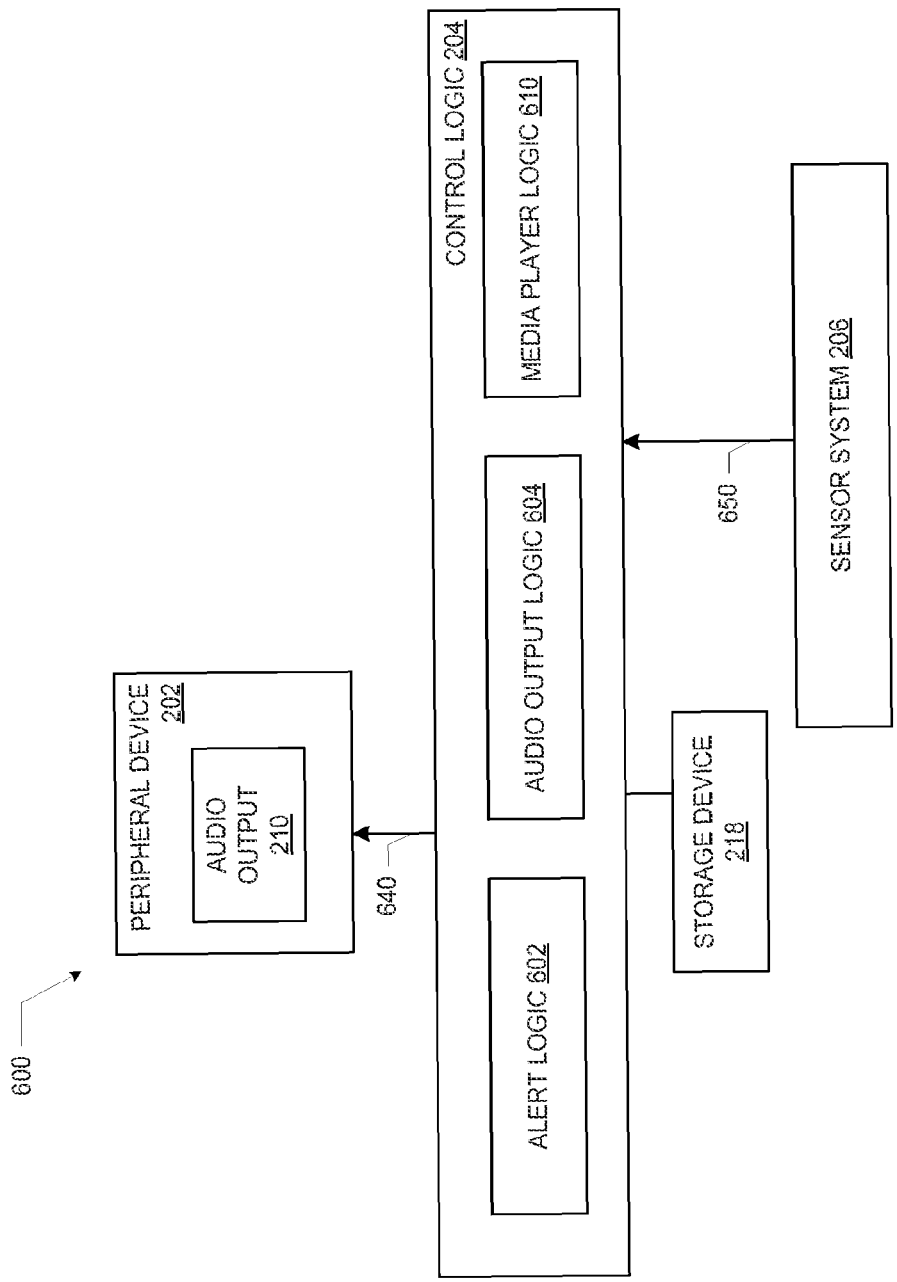
FIG. 6 is a block diagram of an embodiment of the illustrative peripheral control system of FIG. 2, configured for control of an audio output device using an active audio signal and a squeeze signal, in accordance with various embodiments.

FIG. 6 is a block diagram of an embodiment 600 of the peripheral control system 200 of FIG. 2. The peripheral control system 600 may be configured for control of an audio output device (e.g., the audio output device 210) using active audio and squeeze signals, as discussed below.

In the peripheral control system 600, the peripheral device 202 may include the audio output device 210. The audio output device 210 may be implemented in accordance with any of the embodiments of audio output devices described herein, or any other suitable audio output device.

In the peripheral control system 600, the sensor system 206 may take the form of any of the sensor systems described herein, or any other suitable sensor system. For example, in some embodiments, the sensor system may include a plurality of capacitive sensors coupled to a casing of the computing system 100. In a smartphone with an embedded audio output device 210, the capacitive sensors may be coupled to a casing of the smartphone.

In the peripheral control system 600, the trigger signal may include an active audio signal. The active audio signal may indicate that the audio output device 210 is generating sound. In some embodiments, the active audio signal may be generated internally to the control logic 204. For example, the control logic 204 may include media player logic 610. The media player logic 610 may be coupled to the audio output device 210 to cause the audio output device 210 to play audio content. Audio content played via the media player logic 610 may include music, voice messages, the audio component of multimedia content, or any other sound generated in the playback of media. In some such embodiments, the active audio signal may be generated by the media player logic 610 or another component of the control logic 204 to indicate that the media player logic 610 has initiated play of the audio content through the audio output device.

In another example, the control logic 204 may include alert logic 602. The alert logic 602 may be coupled to the audio output device 210 to cause the audio output device 210 to generate an audio alert. An audio alert may refer to any sound intended to notify the user of an occurrence, and may include beeps, ringtones, alarms, or any other notification sound. For example, the alert logic 602 may be configured to cause the audio output device 210 to generate an audio alert to alert the user to an incoming voice communication (e.g., a phone call or voice chat request). In another example, the alert logic 602 may be configured to cause the audio output device 210 to generate an audio alert to alert the user to a timer-based alarm condition (e.g., a preprogrammed "wake-up" alarm clock, interval timer, or calendar-based reminder). In some such embodiments, the active audio signal may be generated by the alert logic 602 or another component of the control logic 204 to indicate that the alert logic 602 has initiated the generation of an alert signal.

In some embodiments, the active audio signal may be provided to the control logic 204 by the sensor system 206, which may generate the active audio signal by processing signals generated by one or more of the sensors included in the sensor system 206. For example, the sensor system 206 may include the microphone 222, which may detect when the audio output device 210 is generating sound and may provide the active audio signal to the control logic 204.

In the peripheral control system 600, the sensor system 206 may generate one or more interaction signals 650. The one or more interaction signals 650 may take the form of any of the interaction signals disclosed herein, including the one or more interaction signals 250 and 450. In some embodiments, the one or more interaction signals 650 may include a squeeze signal. The sensor system 206 may generate a squeeze signal by processing signals generated by one or more of the sensors included in the sensor system 206. The squeeze signal may indicate that a user has squeezed a casing of the computing system 100. For example, the squeeze signal may indicate that a user has squeezed a casing of a smartphone including the audio output device 210. A squeeze may be detected by, for example, identifying a force applied to the casing (e.g., using the pressure sensor 224, the capacitive sensor 230, or another force or displacement detection device) that is sudden and greater than that typically applied when a user picks up and holds the casing. In some embodiments, the squeeze signal may indicate that a user has squeezed a casing of the computing system 100 without activating a designated silence button on the casing, or activated a designated silence region on a touchscreen of the casing. Thus, in some embodiments, the squeeze signal may represent a detection of the physical act of a user squeezing the casing in his or her hand, rather than a user selection of a predetermined button or region of a display. The sensor system 206 may store parameters used in generating the squeeze signal (and/or other interaction signals) in a storage device. These parameters, such as the amount of force, the time over which the force is applied, and/or the pattern of force, for example, may be varied for different applications and may be customized for the user by implementing one or more known training techniques (e.g., machine learning).

In the peripheral control system 600, the control logic 204 may include audio output logic 604, alert logic 602, and media player logic 610. The audio output logic 604 may be coupled with the audio output device 210, and may be configured to receive the active audio signal, receive the squeeze signal (e.g., from the sensor system 206), determine whether the squeeze signal was received within a predetermined interval of the receipt of the active audio signal, and in response to determining that the squeeze signal was received within the predetermined interval, generate a control signal 640. In some embodiments, the control signal 640 may include a silence signal to cause the audio output device 210 to stop the generation of sound. In some embodiments, the audio output logic 604 may be further configured to, after generating the silence signal, generate a start signal to permit the generation of sound by the audio output device 210.

The alert logic 602 and the media player logic 610 are discussed above with reference to trigger signals in the peripheral control system 600. The alert logic 602 and the media player logic 610 may each be coupled to the audio output logic 604. In some embodiments that include the media player logic 610, the silence signal generated by the audio output logic 604 may include a pause signal for output to the media player logic 610 to pause play of the audio content. In some embodiments that include the alert logic 602, the silence signal generated by the audio output logic 604 may include a stop signal for output to the alert logic 602 to stop generation of the audio alert.

Other interaction signals 650 may be received from the sensor system 206, in addition to the squeeze signal, and may be used to determine when the audio output logic 602 generates the control signal 640 for output to the audio output device 210. In some embodiments of the peripheral control system 600, the sensor system 206 may generate an authorization signal (not shown). The sensor system 206 may generate an authorization signal by processing signals generated by one or more of the sensors included in the sensor system 206. The authorization signal may indicate that the user has authorized or not authorized the use of the squeeze signal to silence the audio output device 210. The authorization signal may not need to be provided contemporaneously with the squeeze signal, but may be provided in advance (e.g., through a GUI or other interface). An authorization signal may be useful in embodiments in which a user wants to prevent himself or herself from silencing an alarm clock by squeezing the casing, for example. In some embodiments, an authorization signal may not be included; in some such embodiments, a user may always be able to silence an alarm clock by squeezing the casing.

The peripheral control system 600 of FIG. 6 may provide a number of potential advantages to a user of a computing system with an audio output device. Many such systems provide an audio alert to notify the user of incoming calls or messages, status changes, or events. Additionally, some systems provide audio output for other applications, such as music or video playback. Sometimes, this audio may create a disturbance, an embarrassment, or an interruption for a user (for example, when the user is in a meeting, at a concert or library, or having a conversation). To silence existing systems, a user typically must locate a mute or volume button on a casing of the system, or select a designated region on a touchscreen of the system. This requires the user to visually or haptically orient the system, find the correct button or region, and press or otherwise select the button or region once or multiple times. These actions take time and attention, both of which are at a premium when a user wishes to silence an audio output device, and may be difficult to do when the proper button or region cannot be easily located (e.g., in the dark).

Embodiments of the peripheral control system 600 may provide sensors and control techniques to allow a user to silence the audio output device 210 when it is generating sound by simply squeezing a casing of the computing system 100. In various embodiments, the computing system 100 may be in any orientation when it is squeezed to effectively silence the computing system 100. There may be little to no need for a user to look for, locate, or operate any buttons or designated touchscreen regions. If the computing system 100 is in a pocket or bag, the user may reach into the pocket or bag of the computing system 100 and silence the computing system 100 without removing it from the pocket or bag. Moreover, in some embodiments, the computing system 100 may be configured to use the squeeze signal to control operation of the media player logic 610 (e.g., by pausing the play of media through the media player logic 610 in response to receiving the squeeze signal), in addition to silencing the sound generated by the audio output device 210. This may allow a user to quickly silence and pause media playback without the user having to search for the proper controls in a GUI, or silence the audio by pressing a volume button and separately stop playback of the corresponding video.

Figure 7:
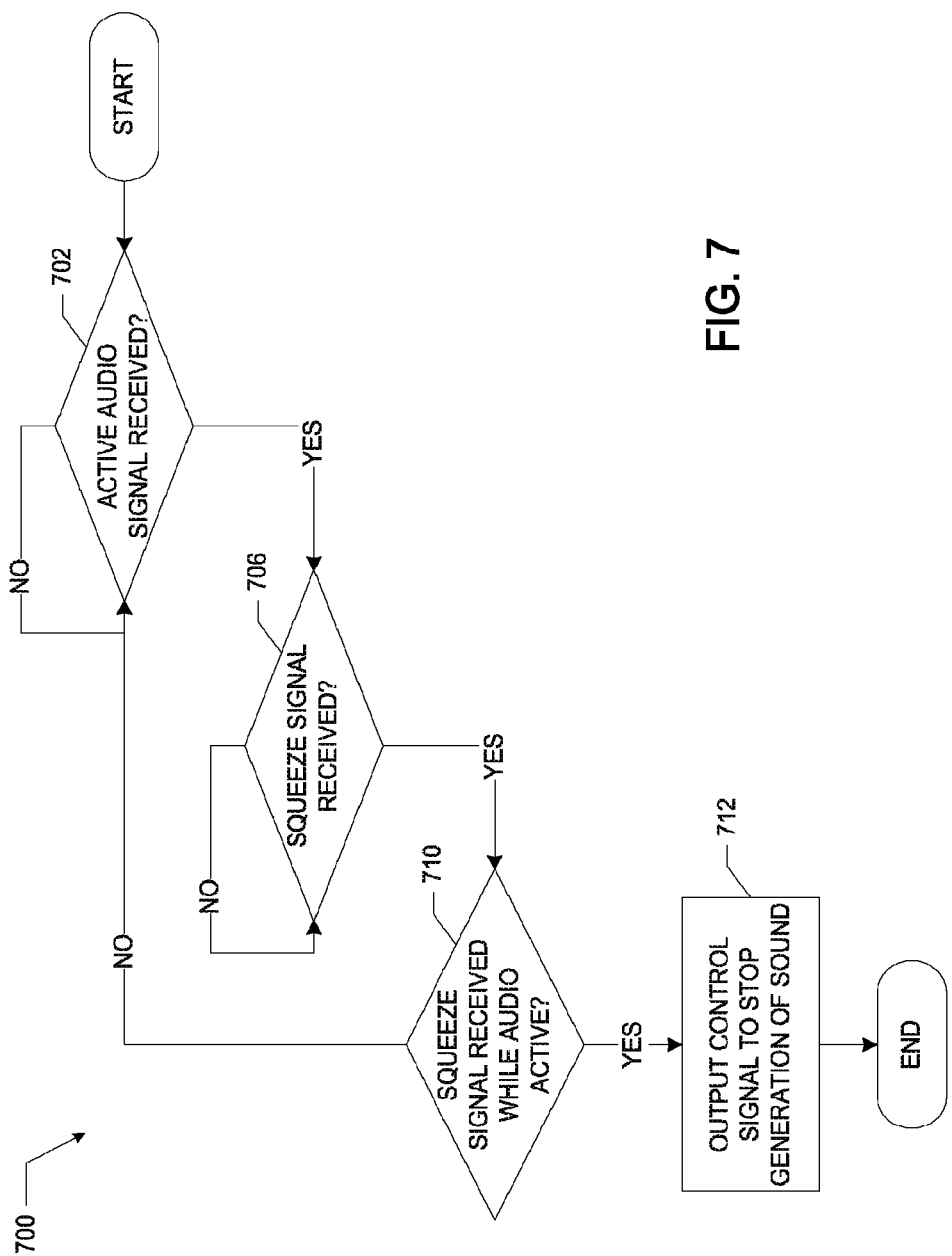
FIG. 7 is a flow diagram illustrating a process for control of an audio output device using an active audio signal and a squeeze signal, in accordance with various embodiments.

FIG. 7 is a flow diagram illustrating a process 700 for control of an audio output device (e.g., the audio output device 210) using a squeeze signal, in accordance with some embodiments. The operations of the process 700, although illustrated as performed in a particular sequence for the sake of illustration, may be performed in parallel as suitable. For example, operations related to determining whether active audio and squeeze signals have been received may be performed in parallel or partially in parallel, or in any suitable order.

Operations of the process 700 may be described as performed by the peripheral control system 600, as embodied in the computing system 100, for illustrative purposes, but the operations of the process 700, including individual operations of the process 700, may be performed by any suitably configured computing device or collection of computing devices. Any of the operations of the process 700 may be performed in accordance with any of the embodiments of the systems 100 and 200 described herein.

The process 700 may begin at the operation 702, in which the peripheral control system 600 (e.g., the audio output logic 604) may determine whether an active audio signal has been received. The active audio signal of the operation 702 may indicate that the audio output device 210 is generating sound. If the peripheral control system 600 determines at the operation 702 that an active audio signal has not been received, the peripheral control system 600 may remain at the operation 702 and continue to monitor for receipt of an active audio signal.

If the peripheral control system 600 determines at the operation 702 that an active audio signal has been received, the peripheral control system 600 may proceed to the operation 706 and determine (e.g., using the audio output logic 604) whether a squeeze signal has been received. The squeeze signal of the operation 506 may indicate that a user has squeezed a casing of the computing system 100. If the peripheral control system 600 determines at the operation 706 that a squeeze signal has not been received, the peripheral control system 600 may remain at the operation 706 and continue to monitor for receipt of a squeeze signal.

If the peripheral control system 600 determines at the operation 706 that a squeeze signal has been received, the peripheral control system 600 (e.g., the audio output logic 604) may proceed to the operation 710, and determine whether the squeeze signal (received at the operation 706) was received while audio output continued to be active (i.e., the audio output device 210 is generating sound). The audio output device 210 may generate sound for different intervals depending on the context; for example, ringing to signal an incoming call may last for less than ten seconds, sounding a wake-up alarm may last for one minute or more, and music playback may last for hours. If the peripheral control system 600 determines at the operation 710 that the squeeze signal was not received while sound was being generated, the peripheral control system 600 may return to the operation 702 and monitor for the receipt of another active audio signal.

If the peripheral control system 600 determines at the operation 710 that the squeeze signal was received while sound is being generated, the peripheral control system 600 may proceed to the operation 712 and generate a control signal 640. The control signal 640 generated at the operation 712 may include any of the silence, pause and stop signals discussed above. In some embodiments, the control signal 640 may be output to the audio output device 210, and may cause the audio output device 210 to stop the generation of sound. The process 700 may then end.

Figure 8:
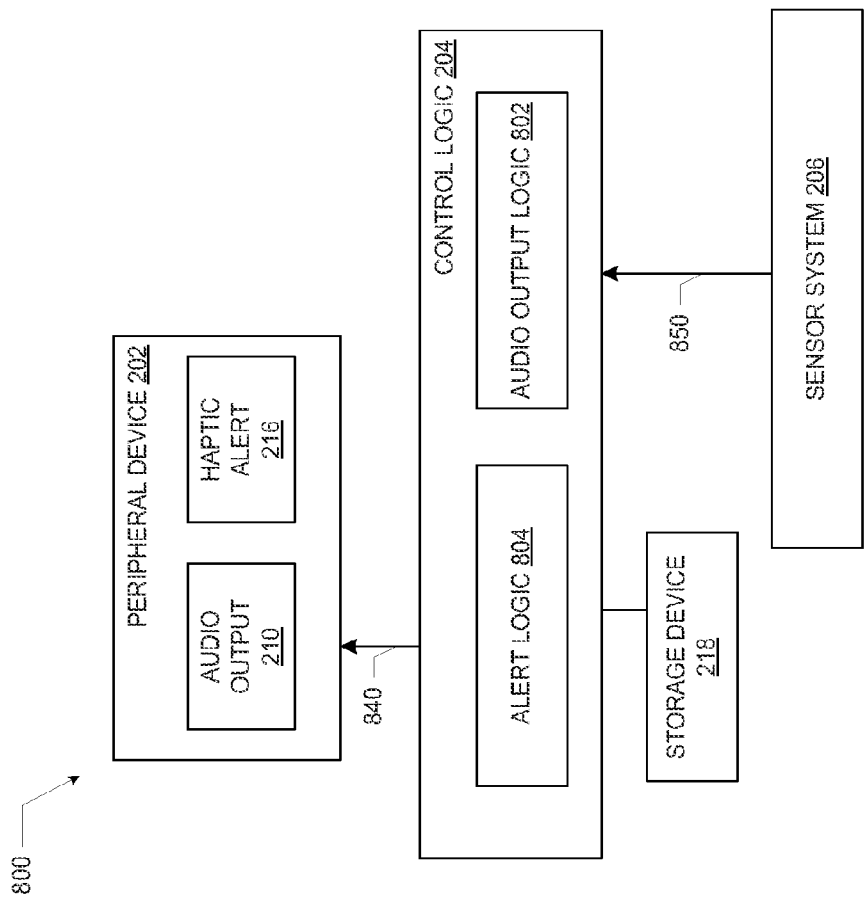
FIG. 8 is a block diagram of an embodiment of the illustrative peripheral control system of FIG. 2, configured for control of an audio output device using an audio alert condition signal and a holding signal, in accordance with various embodiments.

FIG. 8 is a block diagram of an embodiment 800 of the peripheral control system 200 of FIG. 2. The peripheral control system 800 may be configured for control of an audio output device (e.g., the audio output device 210) using a holding signal, as discussed below.

In the peripheral control system 800, the peripheral device 202 may include the audio output device 210. The audio output device 210 may be implemented in accordance with any of the embodiments of audio output devices described herein, or any other suitable audio output device. The sensor system 206 may take the form of any of the sensor systems described herein, or any other suitable sensor system. For example, in some embodiments, the sensor system may include a plurality of capacitive sensors coupled to a casing of the computing system 100. In some embodiments, the sensor system 206 may include a touchscreen (e.g., the touchscreen 228).

In the peripheral control system 800, the trigger signal may include an audio alert condition signal. The audio alert condition signal may be generated by any suitable device in response to an occurrence about which the user should be or is typically notified. The audio alert condition signal may be generated under any of the conditions described above with respect to the alert logic 602 of FIG. 6 (e.g., to alert the user to an incoming voice, text, video, message, or other communication, or to alert the user to a timer-based alarm condition). In some such embodiments, the audio alert condition signal may be generated internally to the control logic 204. For example, the control logic 204 may include alert logic 804. The alert logic 804 may be configured to generate the audio alert condition signal for transmission to other components of the control logic 204.

In some embodiments, the audio alert condition signal may be provided to the control logic 204 by the sensor system 206, which may generate the audio alert condition signal by processing signals generated by one or more of the sensors included in the sensor system 206. For example, the sensor system 206 may include a wireless transceiver (not shown), which may detect an incoming wireless message that would typically trigger the generation of an audio alert, and may provide the audio alert condition signal to the control logic 204.

In the peripheral control system 800, the sensor system 206 may generate one or more interaction signals 850. The one or more interaction signals 850 may take the form of any of the interaction signals disclosed herein, including the one or more interaction signals 250, 450 and 650. In some embodiments, the one or more interaction signals 850 may include a holding signal. The sensor system 206 may generate a holding signal by processing signals generated by one or more of the sensors included in the sensor system 206. The holding signal may indicate that the audio output device 210 is in a user's hand. In some embodiments, the holding signal may indicate that a casing of the computing system 100 is in a user's hand. In some embodiments that include a casing with one or more capacitive sensors (e.g., the capacitive sensor 230), the sensor system 206 may generate the holding signal in response to detecting a user contact with one or more of the capacitive sensors in the casing. In some embodiments that include a touchscreen (e.g., the touchscreen 228), the sensor system 206 may generate the holding signal in response to detecting a user contact with the touchscreen. The holding signal discussed with reference to FIG. 8 may take the form of any of the holding signals discussed with reference to FIG. 4, as suitable (and vice versa).

In the peripheral control system 800, the control logic 204 may include audio output logic 802 and alert logic 804. The audio output logic 802 may be coupled with the audio output device 210, and may be configured to receive the audio alert condition signal, receive the holding signal (e.g., from the sensor system 206), and in response to receiving the audio alert condition signal and the holding signal, generate a control signal 840. In some embodiments, the control signal 840 may include a mute signal to prevent the audio output device 210 from generating an audio alert.

The alert logic 804 is discussed above with reference to trigger signals in the peripheral control system 800. The alert logic 804 may be coupled to the audio output logic 802. In some embodiments that include the alert logic 804, the mute signal generated by the audio output logic 802 may include a mute signal for output to the alert logic 804 to stop generation of future audio alerts.

In some embodiments, the peripheral device 202 may further include a haptic alert device 216. The haptic alert device 216 may be implemented in accordance with any of the embodiments of haptic alert devices described herein, or any other suitable haptic alert device. The audio output logic 802 may be further configured to in response to receiving the audio alert condition signal and the holding signal, generate a haptic alert signal to cause the haptic alert device 216 to generate a haptic alert (e.g., a vibration).

The sensor system 206 may store parameters used in generating the holding signal (and/or other interaction signals) in a storage device. These parameters, such as the amount of force, the time over which the force is applied, and/or the pattern of force, for example, may be varied for different applications and may be customized for the user by implementing one or more known training techniques (e.g., machine learning).

The peripheral control system 800 of FIG. 8 may provide a number of potential advantages to a user of a computing system with an audio output device. As noted above, many such systems provide an audio alert to notify the user of incoming calls or messages, status changes, or events. Users of such devices may have the opportunity to turn on or off all audio alerts; when audio alerts are turned on, the computing system will typically generate an audio alert for all notifications. Having to turn all audio alerts on and off as the user moves through his or her day can be cumbersome, and users often forget whether the audio alerts are turned on or off at any particular time. Even when a user is alone, undesired audio alerts can be startling to a user who is using the computing system to study or read quietly. However, if all audio notifications are turned off, a user may miss important communications or events when he or she wishes to hear them.

Embodiments of the peripheral control system 800 may allow users to keep audio alerts "on," but may reduce unnecessary disturbances to the user by not providing audio alerts when the user is holding the computing system 100. In some such embodiments, alternative alert techniques may be used, such as haptic and visual alerts. In some embodiments of the peripheral control system 800, a user may be provided with an option to mute audio alerts when the system is in a user's hand, in addition to the existing options to mute all or no audio alerts.

FIG. 9 is a flow diagram illustrating a process 900 for control of an audio output device (e.g., the audio output device 210) using a holding signal, in accordance with some embodiments. The operations of the process 900, although illustrated as performed in a particular sequence for the sake of illustration, may be performed in parallel as suitable. For example, operations related to determining whether audio alert condition and holding signals have been received may be performed in parallel or partially in parallel, or in any suitable order.

Operations of the process 900 may be described as performed by the peripheral control system 800, as embodied in the computing system 100, for illustrative purposes, but the operations of the process 900, including individual operations of the process 900, may be performed by any suitably configured computing device or collection of computing devices. Any of the operations of the process 900 may be performed in accordance with any of the embodiments of the systems 100 and 200 described herein.

The process 900 may begin at the operation 902, in which the peripheral control system 800 (e.g., the audio output logic 802) may determine whether an audio alert condition signal has been received. The audio alert condition signal of the operation 902 may be generated by any suitable device in response to an occurrence about which the user should be or is typically notified. If the peripheral control system 800 determines at the operation 902 that an audio alert condition signal has not been received, the peripheral control system 800 may remain at the operation 902 and continue to monitor for receipt of an audio alert condition signal.

If the peripheral control system 800 determines at the operation 902 that an audio alert condition signal has been received, the peripheral control system 800 may proceed to the operation 904 and determine (e.g., using the audio output logic 802) whether a holding signal has been received. The holding signal of the operation 904 may indicate that the audio output device 210 is in a user's hand. If the peripheral control system 800 determines at the operation 904 that a holding signal has not been received, the peripheral control system 800 may return to the operation 902 and monitor for receipt of another audio alert condition signal.

If the peripheral control system 800 determines at the operation 904 that a holding signal has been received, the peripheral control system 800 (e.g., the audio output logic 802) may proceed to the operation 906 and generate a control signal 840. The control signal 840 generated at the operation 906 may prevent the audio output device 210 from generating sound. The process 900 may then end. In some embodiments, once a predetermined interval has elapsed after the operation 906, the peripheral control system 800 may generate a control signal to allow the audio output device 210 to generate sound, and then may return to the operation 902.

As noted throughout this disclosure, some of the techniques disclosed herein may advantageously be implemented in an embodiment of the computing system 100 that includes a sensor system 206 having one or more capacitive sensors 230 in a casing of the computing system 100. Such embodiments may allow the user to control operations of the peripheral device 202 in accordance with the techniques disclosed herein without requiring the user to find the correct button on the casing or move their finger to a touchscreen. Instead, the user may tap, squeeze, swipe, hold, keep still, selectively orient, or otherwise interact with the casing.

The following paragraphs provide a number of examples of the embodiments disclosed herein.

Example 1 is a computing system, including: a peripheral device including an image capture device or an audio output device; and control logic, coupled with a sensor system and the peripheral device. The control logic is to: receive a trigger signal, receive, from the sensor system, one or more interaction signals indicative of a user interaction with the computing system, and in response to receipt of the trigger signal and the one or more interaction signals, generate a control signal for output to the peripheral device to control operation of the peripheral device.

Example 2 may include the subject matter of Example 1, and may further specify that: the peripheral device is an image capture device; the trigger signal includes a tap signal, from the sensor system, indicating that the user has tapped a casing of the computing system; the one or more interaction signals include a holding signal indicating that a user is holding the image capture device in the user's hand and a stillness signal indicating that a motion signature of the image capture device indicates that the user is attempting to hold the image capture device still; the control signal includes a capture signal to cause the image capture device to capture an image; the control logic includes framing detection logic and image capture logic; the framing detection logic is to receive the holding signal, receive the stillness signal, and, in response to receipt of at least the holding and stillness signals, generate a framing signal; and the image capture logic, which is coupled to the framing detection logic and the image capture device, is to receive the tap signal, receive the framing signal, and, in response to receipt of at least the framing signal and the tap signal, generate the capture signal.

Example 3 may include the subject matter of Example 2, and may further specify that: the one or more interaction signals further include an orientation signal indicating that the motion signature of the image capture device indicates that the user is attempting to hold the image capture device in an upright orientation; the framing detection logic is further to receive the orientation signal; and the framing detection logic is to generate the framing signal in response to receiving the holding, stillness and orientation signals.

Example 4 may include the subject matter of Example 3, and may further specify that the image capture device has a principal axis of image capture and the image capture device is in an upright orientation when the principal axis of image capture is approximately horizontal.

Example 5 may include the subject matter of any of Examples 2-4, and may further specify that: the one or more interaction signals further include an authorization signal indicating that the user has authorized image capture operations by the computing system; the image capture logic is further to receive the authorization signal; and the image capture logic is to generate the capture signal in response to receiving the holding, stillness and authorization signals.

Example 6 may include the subject matter of any of Examples 2-5, and may further specify that the image capture logic is to determine whether the tap signal has been received prior to a determination of whether the framing signal has been received.

Example 7 may include the subject matter of any of Examples 2-6, and may further specify that the sensor system includes a plurality of capacitive sensors coupled to a casing of the computing system.

Example 8 may include the subject matter of any of Examples 1-7, and may further specify that: the peripheral device is an audio output device; the trigger signal includes an active audio signal indicating that the audio output device is generating sound; the interaction signal includes a squeeze signal indicating that a user has squeezed a casing of the computing system; the control signal includes a silence signal; and the control logic includes audio output logic, coupled to the audio output device, to receive the active audio signal, receive the squeeze signal, determine whether the squeeze signal was received within a predetermined interval of the receipt of the active audio signal, and, in response to a determination that the squeeze signal was received within the predetermined interval, generate the silence signal.

Example 9 may include the subject matter of Example 8, and may further include media player logic, coupled to the audio output device and the audio output logic, to cause the audio output device to play audio content. Example 9 may further specify that the active audio signal indicates that the audio output device has initiated play of the audio content, and generate the silence signal includes generate a pause signal for output to the media player logic to pause play of the audio content.

Example 10 may include the subject matter of any of Examples 8-9, and may further include alert logic, coupled to the audio output device and the audio output logic, to cause the audio output device to generate an audio alert. Example 10 may further specify that the active audio signal indicates that the audio output device has initiated generation of the audio alert, and generate the silence signal includes generate a stop signal for output to the alert logic to stop generation of the audio alert.

Example 11 may include the subject matter of Example 10, and may further specify that the alert logic is to cause the generation of the audio alert to alert the user to an incoming voice communication.

Example 12 may include the subject matter of any of Examples 10-11, and may further specify that the alert logic is to cause the generation of the audio alert to alert the user to a timer-based alarm condition.

Example 13 may include the subject matter of any of Examples 8-12, and may further specify that the squeeze signal indicates that a user has squeezed a casing of the computing system without activating a designated silence button on the casing or a designated silence region on a touchscreen of the casing.

Example 14 may include the subject matter of any of Examples 8-13, and may further specify that the audio output logic is further to, after generation of the silence signal, generate a start signal to permit the generation of sound by the audio output device.

Example 15 may include the subject matter of any of Examples 1-14, and may further specify that: the peripheral device is an audio output device; the trigger signal includes an audio alert condition signal; the one or more interaction signals include a holding signal indicating that the audio output device is in the users hand; the control signal includes a mute signal to prevent the audio output device from generating an audio alert; and the control logic includes audio output logic, coupled to the audio output device, to receive the audio alert condition signal, receive the holding signal, and, in response to receipt of the audio alert condition signal and the holding signal, generate the mute signal.

Example 16 may include the subject matter of Example 15, and may further include a haptic alert device. Example 16 may further specify that the control signal includes a haptic alert signal to cause the haptic alert device to generate a haptic alert, and the audio output logic is further to, in response to receipt of the audio alert condition signal and the holding signal, generate the haptic alert signal.

Example 17 may include the subject matter of any of Examples 15-16, and may further include the sensor system, coupled to the audio output logic and including a casing sensor, to generate the holding signal in response to detecting user contact with the casing sensor.

Example 18 is a method for control of a peripheral device, including: receiving, by a computing system, a trigger signal; receiving, by the computing system from a sensor system, one or more interaction signals indicative of a user interaction with the computing system; and in response to receipt of the trigger signal and the one or more interaction signals, generating, by the computing system, a control signal for output to a peripheral device to control operation of the peripheral device, the peripheral device including an image capture device or an audio output device.

Example 19 may include the subject matter of Example 18, and may further specify that: the peripheral device is an image capture device; the trigger signal includes a tap signal, from the sensor system, indicating that the user has tapped a casing of the computing system; the one or more interaction signals include a holding signal indicating that a user is holding the image capture device in the user's hand and a stillness signal indicating that a motion signature of the image capture device indicates that the user is attempting to hold the image capture device still; the control signal includes a capture signal to cause the image capture device to capture an image; and the capture signal is generated in response to receiving at least the holding signal, the stillness signal and the tap signal.

Example 20 may include the subject matter of Example 19, and may further specify that the one or more interaction signals further include an orientation signal indicating that the motion signature of the image capture device indicates that the user is attempting to hold the image capture device in an upright orientation, and the capture signal is generated in response to receiving the holding, stillness, orientation, and tap signals.

Example 21 may include the subject matter of Example 20, and may further specify that the image capture device has a principal axis of image capture and the image capture device is in an upright orientation when the principal axis of image capture is approximately horizontal.

Example 22 may include the subject matter of any of Examples 19-21, and may further specify that the one or more interaction signals further include an authorization signal indicating that the user has authorized image capture operations by the computing system, and the capture signal is generated in response to receiving the holding, stillness, authorization, and tap signals.

Example 23 may include the subject matter of any of Examples 19-22, and may further include determining whether the tap signal has been received prior to determining whether the framing signal has been received.

Example 24 may include the subject matter of any of Examples 19-23, and may further specify that the sensor system includes a plurality of capacitive sensors coupled to a casing of the computing system.

Example 25 may include the subject matter of any of Examples 18-24, and may further specify that: the peripheral device is an audio output device; the trigger signal includes an active audio signal indicating that the audio output device is generating sound; the interaction signal includes a squeeze signal indicating that a user has squeezed a casing of the computing system; and the control signal includes a silence signal. Example 25 may further specify that generating, by the computing system, the control signal for output to the peripheral device to control operation of the peripheral device includes: determining, by the computing system, whether the squeeze signal was received within a predetermined interval of receiving the active audio signal, and in response to determining that the squeeze signal was received within the predetermined interval, generating, by the computing system, the silence signal.

Example 26 may include the subject matter of Example 25, and may further specify that the active audio signal indicates that the audio output device has initiated play of audio content from media player logic, and generating the silence signal includes generating a pause signal for output to the media player logic to pause play of the audio content.

Example 27 may include the subject matter of any of Examples 25-26, and may further specify that the active audio signal indicates that the audio output device has initiated generation of an audio alert from alert logic, and generating the silence signal includes generating a stop signal for output to the alert logic to stop generation of the audio alert.

Example 28 may include the subject matter of Example 27, and may further specify that the alert logic is to cause the generation of the audio alert to alert the user to an incoming voice communication.

Example 29 may include the subject matter of any of Examples 27-28, and may further specify that the alert logic is to cause the generation of the audio alert to alert the user to a timer-based alarm condition.

Example 30 may include the subject matter of any of Examples 25, and may further specify that the squeeze signal indicates that a user has squeezed a casing of the computing system without activating a designated silence button on the casing or a designated silence region on a touchscreen of the casing.

Example 31 may include the subject matter of any of Examples 25-30, and may further include, after generating the silence signal, generating, with the computing system, a start signal to permit the generation of sound by the audio output device.

Example 32 may include the subject matter of any of Examples 18-31, and may further specify that: the peripheral device is an audio output device; the trigger signal includes an audio alert condition signal; the one or more interaction signals include a holding signal indicating that the audio output device is in the user's hand; the control signal includes a mute signal to prevent the audio output device from generating an audio alert; and the mute signal is generated in response to receiving the audio alert condition signal and the holding signal.

Example 33 may include the subject matter of Example 32, and may further specify that the control signal includes a haptic alert signal to cause a haptic alert device to generate a haptic alert, and the haptic alert signal is generated in response to receiving the audio alert condition signal and the holding signal.

Example 34 may include the subject matter of any of Examples 32-33, and may further specify that the sensor system includes a casing sensor, and wherein the sensor system generates the holding signal in response to detecting user contact with the casing sensor.

Example 35 is a system for control of a peripheral device, including: means for receiving, by a computing system, a trigger signal; means for receiving, by the computing system from a sensor system, one or more interaction signals indicative of a user interaction with the computing system; and means for, in response to receipt of the trigger signal and the one or more interaction signals, generating, by the computing system, a control signal for output to a peripheral device to control operation of the peripheral device, the peripheral device including an image capture device or an audio output device.

Example 36 may include the subject matter of Example 35, and may further specify that: the peripheral device is an image capture device; the trigger signal includes a tap signal, from the sensor system, indicating that the user has tapped a casing of the computing system; the one or more interaction signals include a holding signal indicating that a user is holding the image capture device in the user's hand and a stillness signal indicating that a motion signature of the image capture device indicates that the user is attempting to hold the image capture device still; the control signal includes a capture signal to cause the image capture device to capture an image; and the capture signal is generated in response to receiving at least the holding signal, the stillness signal and the tap signal.

Example 37 may include the subject matter of any of Examples 35-36, and may further specify that: the peripheral device is an audio output device; the trigger signal includes an active audio signal indicating that the audio output device is generating sound; the interaction signal includes a squeeze signal indicating that a user has squeezed a casing of the computing system; and the control signal includes a silence signal. Example 37 may further specify that the means for generating the control signal for output to the peripheral device to control operation of the peripheral device includes: means for determining whether the squeeze signal was received within a predetermined interval of receiving the active audio signal, and means for, in response to determining that the squeeze signal was received within the predetermined interval, generating the silence signal.

Example 38 may include the subject matter of any of Examples 35-37, and may further specify that: the peripheral device is an audio output device; the trigger signal includes an audio alert condition signal; the one or more interaction signals include a holding signal indicating that the audio output device is in the user's hand; the control signal includes a mute signal to prevent the audio output device from generating an audio alert; and the mute signal is generated in response to receiving the audio alert condition signal and the holding signal.

Example 39 is one or more computer readable media having instructions thereon that, when executed by one or more processing devices of a computing device, cause the computing device to perform the method of any of Examples 18-34.

Example 40 is a system including: one or more processing devices; and one or more computer readable media having instructions thereon that, when executed by the one or more processing devices, cause the apparatus to perform the method of any of Examples 18-34.

Example 41 is a system including means for performing the method of any of Examples 18-34.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein.

What is claimed is:

1. A computer system, comprising:
a peripheral device including an audio output device; and
control logic, coupled with a sensor system and the peripheral device to:
    receive a trigger signal indicative of occurrence of an event,
    receive, from the sensor system, one or more interaction signals indicative of a user interaction with the computer system,
    in response to receipt of the trigger signal within a predetermined time of receipt of the one or more interaction signals, generate a control signal for output to the peripheral device to control operation of the peripheral device, wherein generation of the control signals includes:
        generation of a first control signal for output of an audio signal to the peripheral device when the one or more interaction signals are indicative of a first user interaction with the computer system, wherein the audio signal is to provide an audio alert of the event, and
        generation of a second control signal for output of a silence signal or a mute signal to the peripheral device when the one or more interaction signals are indicative of a second user interaction with the computer system, and based on the generation of the second control signal, generation of a third control signal for output to the peripheral device, wherein the third control signal for output to the peripheral device is to provide a non-audio alert of the event.

2. The computer system of claim 1, wherein:
the trigger signal comprises an active audio signal indicating that the audio output device is generating sound;
the one or more interaction signals indicative of the second user interaction comprises a squeeze signal indicating that a user has squeezed a casing of the computer system; and
the control logic comprises audio output logic, coupled to the audio output device, to:
    receive the active audio signal,
    receive the squeeze signal,
    determine whether the squeeze signal was received within the predetermined time of the receipt of the active audio signal, and
    in response to a determination that the squeeze signal was received within the predetermined time, generate the second control signal including the silence signal.

3. The computer system of claim 2, further comprising:
media player logic, coupled to the audio output device and the audio output logic, to cause the audio output device to play audio content;
wherein the active audio signal indicates that the audio output device has initiated play of the audio content; and
wherein generation of the silence signal comprises generation of a pause signal for output to the media player logic to pause play of the audio content.

4. The computer system of claim 2, further comprising:
alert logic, coupled to the audio output device and the audio output logic, to cause the audio output device to generate an audio alert;
wherein the active audio signal indicates that the audio output device has initiated generation of the audio alert; and
wherein generation of the silence signal comprises generation of a stop signal for output to the alert logic to stop generation of the audio alert.

5. The computer system of claim 4, wherein the alert logic is to cause the generation of the audio alert to alert the user to an incoming voice communication.

6. The computer system of claim 4, wherein the alert logic is to cause the generation of the audio alert to alert the user to a timer-based alarm condition.

7. The computer system of claim 2, wherein the squeeze signal indicates that a user has squeezed a casing of the computer system without activating a designated silence button on the casing or a designated silence region on a touchscreen of the casing.

8. The computer system of claim 2, wherein the audio output logic is further to:
after generation of the silence signal, generate a start signal to permit the generation of sound by the audio output device.

9. The computer system of claim 1, wherein:
the trigger signal comprises an audio alert condition signal;
the one or more interaction signals indicative of the second user interaction comprises a holding signal indicating that the audio output device is in the user's hand; and
the control logic comprises audio output logic, coupled to the audio output device, to:
    receive the audio alert condition signal,
    receive the holding signal, and
    in response to receipt of the audio alert condition signal and the holding signal, generate the second control signal including the mute signal, wherein the mute signal is to prevent the audio output device from generating the audio alert.

10. The computer system of claim 9, further comprising:
a haptic alert device;
wherein the third control signal comprises a haptic alert signal to cause the haptic alert device to generate a haptic alert; and
wherein the audio output logic is further to:
    in response to receipt of the audio alert condition signal and the holding signal, generate the third control signal including the haptic alert signal.

11. The computer system of claim 9, further comprising:
the sensor system, coupled to the audio output logic and comprising a casing sensor, to generate the holding signal in response to detecting user contact with the casing sensor.

12. One or more non-transitory computer readable media having instructions thereon that, when executed by one or more processing devices of a computer system, cause the computer system to:
- receive a trigger signal indicative of occurrence of an event;
- receive, from a sensor system, one or more interaction signals indicative of a user interaction with the computer system;
- in response to receipt of the trigger signal within a predetermined interval of receipt of the one or more interaction signals, generate a control signal for output to a peripheral device to control operation of the peripheral device, the peripheral device comprising an audio output device, wherein generation of the control signals includes:
  - generation of a first control signal for output of an audio signal to the peripheral device when the one or more interaction signals are indicative of a first user interaction with the computer system, wherein the audio signal is to provide an audio alert of the event, and
  - generation of a second control signal for output of a silence signal or a mute signal to the peripheral device when the one or more interaction signals are indicative of a second user interaction with the computer system, and based on the generation of the second control signal, generation of a third control signal for output to the peripheral device, wherein the third control signal for output to the peripheral device is to provide a non-audio alert of the event.

13. The one or more non-transitory computer readable media of claim 12, wherein:
- the trigger signal comprises an active audio signal indicating that the audio output device is generating sound;
- the one or more interaction signals indicative of the second user interaction comprises a squeeze signal indicating that a user has squeezed a casing of the computer system; and
- to generate the second control signal, execution of the instructions causes the computer system to:
  - determine whether the squeeze signal was received within the predetermined interval of receiving the active audio signal, and
  - in response to a determination that the squeeze signal was received within the predetermined interval, generate the second control signal including the silence signal.

14. The one or more non-transitory computer readable media of claim 12, wherein:
- the trigger signal comprises an audio alert condition signal;
- the one or more interaction signals indicative of the second user interaction comprises a holding signal indicating that the audio output device is in the user's hand; and
- to generate the second control signal, execution of the instructions causes the computer system to:
  - determine whether the holding signal was received within the predetermined interval of receiving the audio alert condition signal, and
  - generate the second control signal including the mute signal in response to receipt of the audio alert condition signal and the holding signal within the predetermined interval, wherein the mute signal is to prevent the audio output device from generating an audio alert.

15. A method for control of a peripheral device, comprising:
- receiving, by a computer system, a trigger signal indicative of occurrence of an event;
- receiving, by the computer system from a sensor system, one or more interaction signals indicative of a user interaction with the computer system;
- in response to receipt of the trigger signal within a predetermined time of receipt of the one or more interaction signals, generating, by the computer system, a control signal for output to a peripheral device to control operation of the peripheral device, the peripheral device comprising an audio output device, wherein the generating the control signal comprises:
  - generating, by the computer system, a first control signal for output of an audio signal to the peripheral device when the one or more interaction signals are indicative of a first user interaction with the computer system, wherein the audio signal is to provide an audio alert of the event, and
  - generating, by the computer system, a second control signal for output of a silence signal or a mute signal to the peripheral device when the one or more interaction signals are indicative of a second user interaction with the computer system, and based on the generation of the second control signal, generation of a third control signal for output to the peripheral device, wherein the third control signal for output to the peripheral device is to provide a non-audio alert of the event.

16. The method of claim 15, wherein:
the trigger signal comprises an active audio signal indicating that the audio output device is generating sound;
the one or more interaction signals indicative of the second user interaction comprises a squeeze signal indicating that a user has squeezed a casing of the computer system; and
the generating the second control signal comprises:
  - determining, by the computer system, whether the squeeze signal was received within the predetermined time of receiving the active audio signal, and
  - in response to determining that the squeeze signal was received within the predetermined time, generating, by the computer system, the second control signal including the silence signal.

17. The method of claim 15, wherein:
the trigger signal comprises an audio alert condition signal;
the one or more interaction signals indicative of the second user interaction comprises a holding signal indicating that the audio output device is in the user's hand;
the generating the second control signal comprises:
determining, by the computer system, whether the holding signal was received within the predetermined time of receiving the audio alert condition signal, and
generating, by the computer system, the second control signal including the mute signal in response to receiving the audio alert condition signal and the holding signal within the predetermined time.

18. The computer system of claim 9 wherein:
the holding signal indicates one or more of an amount of force being applied to the computer system, a time over which the force is applied, and a pattern that the force is applied to the computer system, and
the second control signal is to be generated when the holding signal indicates that the time over which the force is applied is greater than or equal to a predetermined amount of time or when the holding signal indicates that the amount of force being applied is greater than or equal to a predetermined amount of force, or the first control signal is to be generated when the holding signal indicates that the time over which the force is applied is less than the predetermined amount of time or when the holding signal indicates that the amount of force being applied is less than the predetermined amount of force.

19. The computer system of claim 10 wherein:

the holding signal indicates one or more of an amount of force being applied to the computer system, a time over which the force is applied, and a pattern that the force is applied to the computer system, and the second control signal is to be generated when the holding signal indicates that the time over which the force is applied is greater than or equal to a predetermined amount of time or when the holding signal indicates that the amount of force being applied is greater than or equal to a predetermined amount of force, or the first control signal is to be generated when the holding signal indicates that the time over which the force is applied is less than the predetermined amount of time or when the holding signal indicates that the amount of force being applied is less than the predetermined amount of force.

20. The one or more non-transitory computer readable media of claim 12, wherein:

the third control signal comprises a haptic alert signal to cause a haptic device to generate a haptic alert;

the one or more interaction signals indicative of the second user interaction comprise a holding signal indicating that the audio output device is in the user's hand, wherein the holding signal indicates one or more of an amount of force being applied to the computer system, a time over which the force is applied, and a pattern that the force is applied to the computer system; and execution of the instructions by the one or more processing devices causes the computer system to:

determine whether the holding signal indicates that the time over which the force is applied is greater than or equal to a predetermined amount of time and the holding signal indicates that the amount of force being applied is greater than or equal to a predetermined amount of force; and generate the third control signal including the haptic alert signal when the holding signal indicates that the time over which the force is applied is greater than or equal to a predetermined amount of time and when the holding signal indicates that the amount of force being applied is greater than or equal to a predetermined amount of force, or generate the first control signal when the holding signal indicates that the time over which the force is applied is less than the predetermined amount of time or when the holding signal indicates that the amount of force being applied is less than [[to ]]the predetermined amount of force.

* * * * *